US009298965B2

(12) United States Patent
Aoki

(10) Patent No.: US 9,298,965 B2
(45) Date of Patent: Mar. 29, 2016

(54) BIOMETRIC AUTHENTICATION DEVICE AND BIOMETRIC AUTHENTICATION METHOD

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 404 days.

(21) Appl. No.: 13/908,582

(22) Filed: Jun. 3, 2013

(65) Prior Publication Data

US 2013/0259321 A1 Oct. 3, 2013

Related U.S. Application Data

(63) Continuation of application No. PCT/JP2010/071718, filed on Dec. 3, 2010.

(51) Int. Cl.
| | | |
|---|---|---|
| G06K 9/00 | (2006.01) | |
| G06K 9/20 | (2006.01) | |
| H04N 5/232 | (2006.01) | |
| H04N 5/235 | (2006.01) | |

(52) U.S. Cl.
CPC ........ *G06K 9/00006* (2013.01); *G06K 9/00885* (2013.01); *G06K 9/2027* (2013.01); *G06K2009/00932* (2013.01); *H04N 5/2352* (2013.01); *H04N 5/2354* (2013.01); *H04N 5/2356* (2013.01); *H04N 5/23232* (2013.01)

(58) Field of Classification Search
CPC ............ G06K 9/0004; G06K 9/00885; G06K 2009/00932; G06K 9/00004; G06K 9/2027; H04N 5/23232; H04N 5/2352; H04N 5/2353; H04N 5/2354; H04N 5/2356; H04N 5/238
See application file for complete search history.

(56) References Cited

U.S. PATENT DOCUMENTS

| 6,144,366 A | 11/2000 | Numazaki et al. | |
|---|---|---|---|
| 2007/0263099 A1* | 11/2007 | Motta ................. | H04N 5/2354 348/222.1 |
| 2008/0079842 A1* | 4/2008 | Aoki .................. | H04N 5/23232 348/366 |

FOREIGN PATENT DOCUMENTS

| JP | 10-222285 | 8/1998 |
|---|---|---|
| JP | 2001-357396 | 12/2001 |
| JP | 2003-208599 | 7/2003 |
| JP | 2008-90412 | 4/2008 |

OTHER PUBLICATIONS

Li et al., "Integrating intensity and texture differences for robust change detection", Feb. 2002, IEEE Transactions on Image Processing, vol. 11, iss. 2, p. 105-112.*
International Search Report mailed Dec. 28, 2010 for corresponding International Application No. PCT/JP2010/071718.

* cited by examiner

*Primary Examiner* — Stephen R Koziol
*Assistant Examiner* — Timothy Choi
(74) *Attorney, Agent, or Firm* — Staas & Halsey LLP

(57) ABSTRACT

A biometric authentication device includes a sensor which generates illumination images in which an object carrying biometric information is photographed while a light source is turned on, and a non-illumination image in which the object is photographed while the light source is turned off. The biometric authentication device generates difference images by subtracting from a luminance value of each pixel of each illumination image a luminance value of a corresponding pixel of the non-illumination image and determines an integration number, based on a statistical value of luminance values of a first difference image, so that the integration number increases as an influence of luminance values of pixels included in at least one region of the first difference image due to the noise superimposed on the first difference image increases, and generates the biometric image based on the integration number of the difference images.

13 Claims, 11 Drawing Sheets

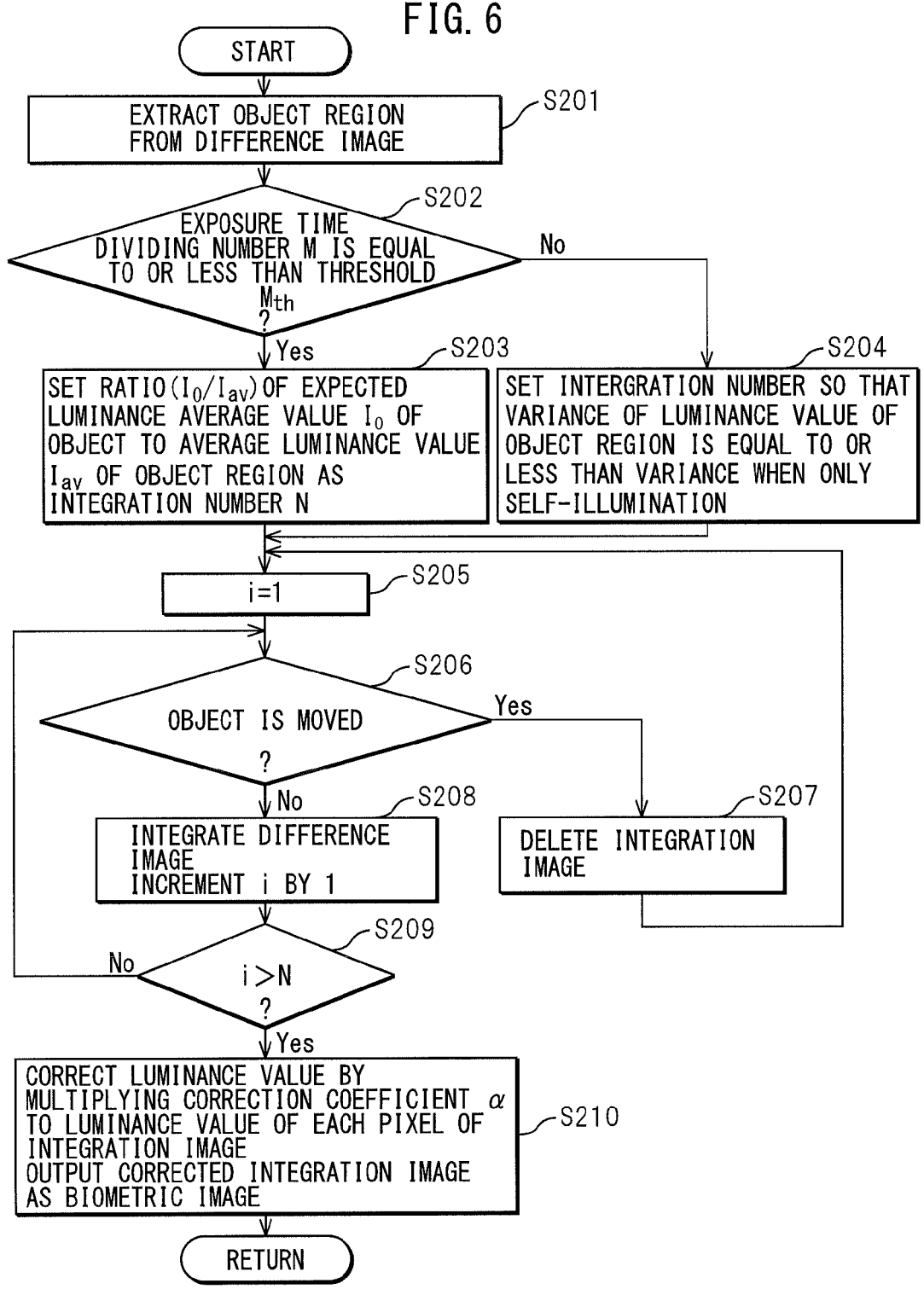

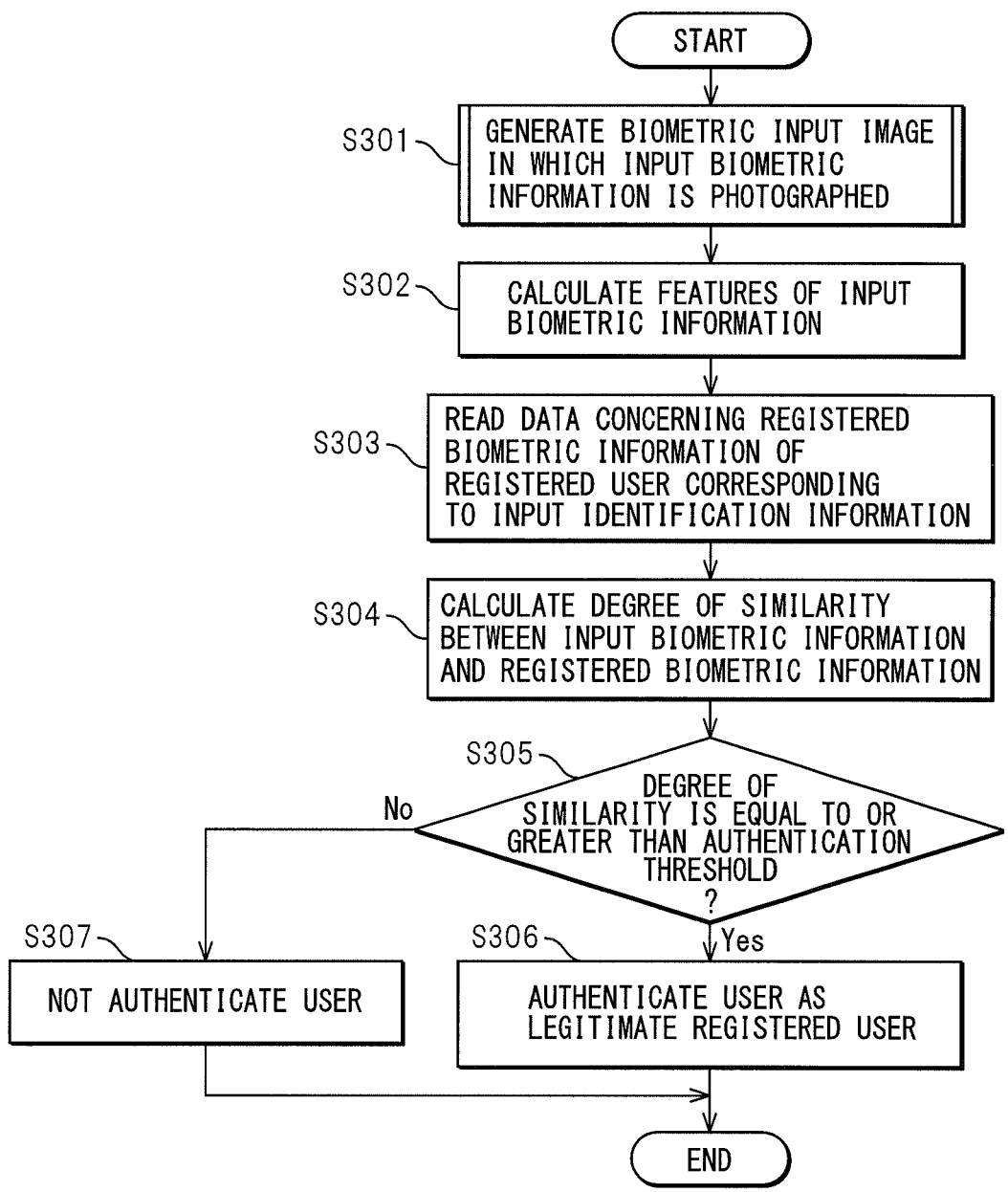

| NUMBER OF<br>SATURATED PIXELS | EXPOSURE TIME<br>SETTING VALUE |
|---|---|
| 0~100 | $E_0$ |
| 101~200 | $E_1$ |
| 201~300 | $E_2$ |

800

| No | RECTANGULAR AREA | VARIANCE VALUE $S^2$ | INTEGRATION NUMBER N |
|---|---|---|---|
| 1 | (x1,y1)-(x2,y2) | $v_1$ | $N_1$ |
| 2 | (x3,y3)-(x4,y4) | $v_2$ | $N_2$ |

~1000

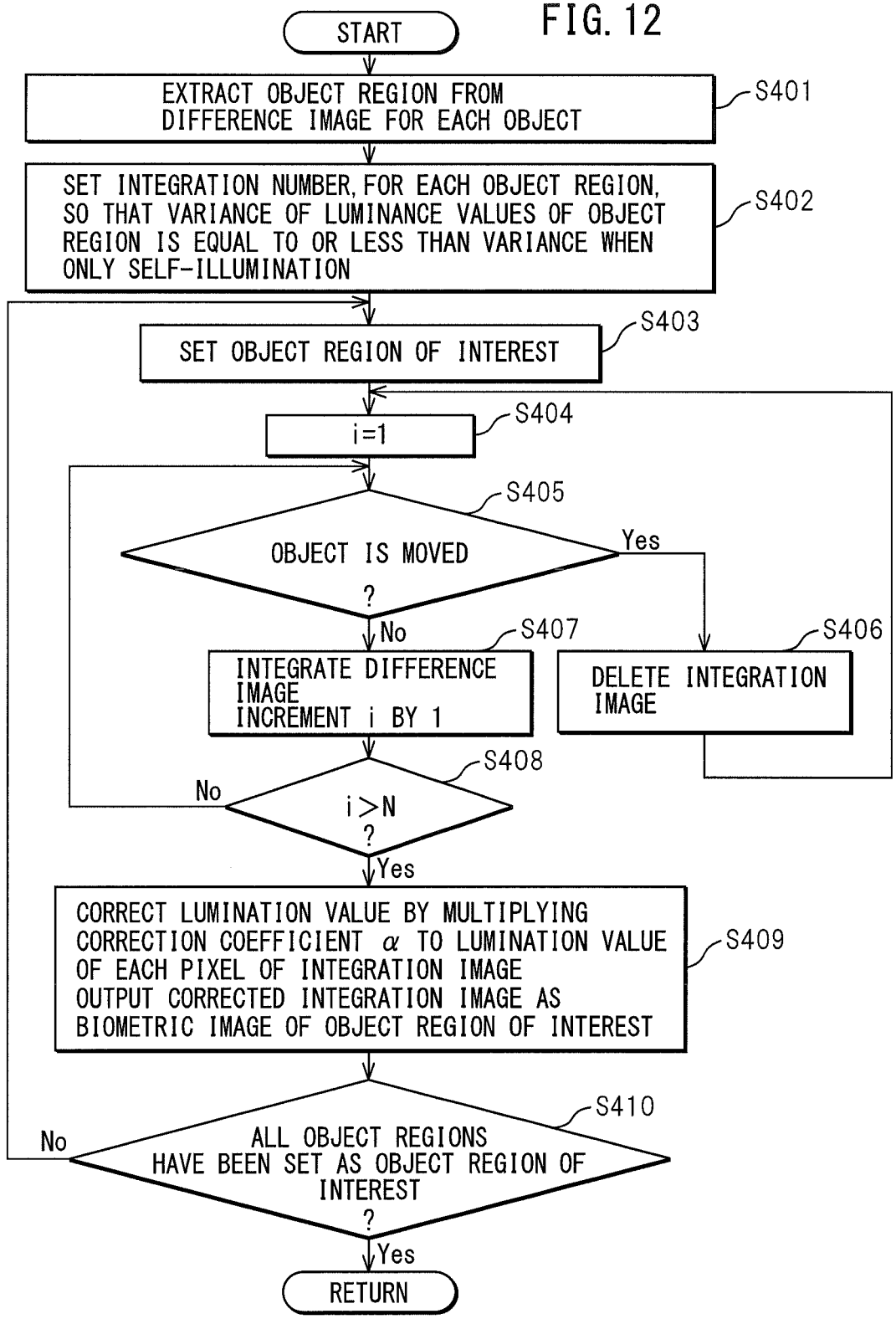

BIOMETRIC AUTHENTICATION DEVICE AND BIOMETRIC AUTHENTICATION METHOD

CROSS-REFERENCE TO RELATED APPLICATION

This application is a continuation application and is based upon PCT/JP2010/071718, filed on Dec. 3, 2010, the entire contents of which are incorporated herein by reference.

FIELD

The present invention relates to, for example, a biometric authentication device and a biometric authentication method, which determine whether or not a user is allowed to use a biometric image on which biometric information of the user is captured.

BACKGROUND

Recent years have seen the development of biometric authentication technology for authenticating a user of an apparatus or system based on a biometric image representing the user's biometric information such as a palm or finger vein pattern or a fingerprint or palm print. A biometric authentication device using such biometric authentication technology acquires, for example, as an input biometric image, a biometric image representing the biometric information of the user who wishes to use the biometric authentication device. Then, the biometric authentication device compares the user's input biometric information represented by the input biometric image with registered biometric information, i.e., biometric information represented in a biometric image for each registered user. If the result of the comparison indicates that the input biometric information matches the registered biometric information, the biometric authentication device authenticates the user as being a legitimate registered user. The biometric authentication device then permits the authenticated user to use the apparatus in which the biometric authentication device is incorporated or some other apparatus connected to the biometric authentication device.

In such biometric authentication technology, it is preferable that a characteristic structure of the biometric information is clearly captured on a biometric image, in order to compare data of a user in high accuracy. Therefore, a sensor which photographs the biometric information to generate a biometric image may include an illumination light source illuminating an object, such as a hand carrying the biometric information.

However, when a sensor photographs an object carrying the biometric information, the object being illuminated by environmental light such as sunlight, a biometric image may be unsuitable for a biometric authentication due to an influence of environmental light. For example, when the amount of light of environmental light entering into a sensor is large, a local luminance change on a biometric image resulting from a variation in the amount of environmental light is large, and therefore a luminance distribution may occur not depending on the biometric information on a biometric image. In particular, when a sensor directly receives strong environmental light, luminance values of pixels on a biometric image may be saturated, and a characteristic structure of a biometric image may not be captured on the biometric image.

In view of such a matter, there is a technique of adjusting luminance values of pixels of a biometric image by adjusting the amount of illumination light and exposure time at the time of photographing an object. For example, when a light emitting diode is used as an illumination light source, the amount of light per unit time is adjusted by adjusting period in which the light emitting diode is turned on according to a pulse-width modulation control of drive current. However, since the amount of emitting light of a light emitting diode changes according to an individual specificity, aging, or temperature, the light quantity may change even when current flowing through a light emitting diode is constant. Moreover, it is undesirable to excessively enlarge the amount of illumination light from a viewpoint of a security or power consumption. For example, a sensor may be connected to a computer through a Universal Serial Bus (USB) interface, and electric power supply may be made from the USB interface. In this case, since power consumption of an illumination light source is kept lower than an upper limit of the power consumption determined by the standard of USB, the amount of illumination light is also limited by the upper limit. Therefore, it is difficult to adjust the amount of illumination light according to the amount of light of environmental light.

In view of such a matter, techniques generating a biometric image has been developed by combining images photographed by a sensor according to environmental light of a circumference of the sensor (refer to Japanese Laid-open Patent Publication No. 10-222285, Japanese Laid-open Patent Publication No. 2001-357396 and Japanese Laid-open Patent Publication No. 2008-90412).

In an example of such known techniques, a target object image is extracted by calculating a difference component between a target object image when a target object is not illuminated by illumination light, and a target object image when the target object is illuminated by the illumination light.

In another example of the known techniques, a composed image in which biometric information is represented is generated by superimposing a predetermined number of accumulated images by an image compositing process unit so that an average luminance in a predetermined region is within a predetermined range of luminance, based on luminance information of an image obtained by photographing the biometric information by photographing means.

In still another example of the known techniques, predetermined exposure time is divided into a plurality of division exposure time. A plurality of illumination images are generated by subtracting luminance value of each pixel of an image obtained by illuminating and photographing an object carrying the biometric information for every division exposure time, from luminance value of each pixel of an image obtained by photographing the object without illumination. Then, an integrated image representing the biometric information is generated by integrating the plurality of illumination images.

SUMMARY

However, amount of noise superimposed on an image to be combined is changed depending on environmental light at the time of acquiring biometric images. When the amount of the superimposed noises increases, it may be difficult that a biometric authentication device extracts a feature point of the biometric information to be utilized for a matching from a biometric image, or incorrectly detects an artifact provided on a biometric image as a feature point. As a result, when a biometric image, in which the amount of superimposed noises is large, is used for a biometric authentication, precision of the biometric authentication may be reduced.

According to one embodiment, a biometric authentication device which performs a biometric authentication of a user using a biometric image in which an object carrying biometric information of the user is photographed is provided. The biometric authentication device includes an illumination light source which illuminates the object; a sensor which generates a plurality of illumination images in which the object is photographed in a state where the illumination light source is turned on, and at least one non-illumination image in which the object is photographed in a state where the illumination light source is turned off; a difference image generating unit which generates a plurality of difference images by subtracting from a luminance value of each pixel of each illumination image a luminance value of corresponding pixel of the non-illumination image; and a biometric image generating unit which generates the biometric image based on a plurality of difference images.

The biometric image generating unit realizes an integration number determination function determining an integration number, based on a statistical value of luminance values of a first difference image which represents an amount of noise superimposed on the first difference image among the plurality of difference images, so that the integration number of the difference images increases as an influence of luminance values of the pixels included in at least one region in the first difference image due to the noise superimposed on the first difference image increases, and an image integration function generating the biometric image by calculating luminance values of respective pixels of the biometric image based on a total of luminance values of the corresponding pixels of the difference images, the number of which is the integration number, among the plurality of difference images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 is an operational flowchart of a biometric image generating process.

FIG. 7 is an operational flowchart of a biometric authentication process.

FIG. 12 is an operational flowchart of the biometric image generating process according to the second embodiment.

DESCRIPTION OF EMBODIMENTS

Biometric authentication devices according to various embodiments will be described below with reference to the drawings.

The biometric authentication device generates a plurality of illumination images obtained by photographing an object carrying the biometric information of a user in a state where the object carrying the biometric information is illuminated by an illumination light source, and at least one non-illumination image obtained by photographing the object in a state where the illumination light source is turned off. The biometric authentication device generates a plurality of difference images by subtracting from a luminance value of each pixel of each illumination image, a luminance value of corresponding pixel of the non-illumination image. The biometric authentication device generates, based on a statistical value of the luminance value of the difference image representing the amount of the noise superimposed on the difference image, the biometric image used for a biometric authentication by integrating more difference images, as the influence on the luminance value due to the noise increases.

In the present embodiment, the biometric authentication device utilizes a palm or finger vein pattern as the biometric information used for the biometric authentication. However, the biometric information used for the biometric authentication may be other biometric information, such as a fingerprint or a palm print, which can be photographed under environmental light.

In the present specification, the term "matching process" is used to refer to a process which calculates a degree of similarity indicating a similar degree between input biometric information which is the biometric information represented in the input biometric image acquired at the time of matching, and the registered biometric information which is the biometric information registered in advance. Further, the term "biometric authentication process" is used to refer to the entire authentication process which includes not only the matching process but also the process for determining whether the user is an authenticated user or not based on the degree of similarity obtained by the matching process.

Figure 1:
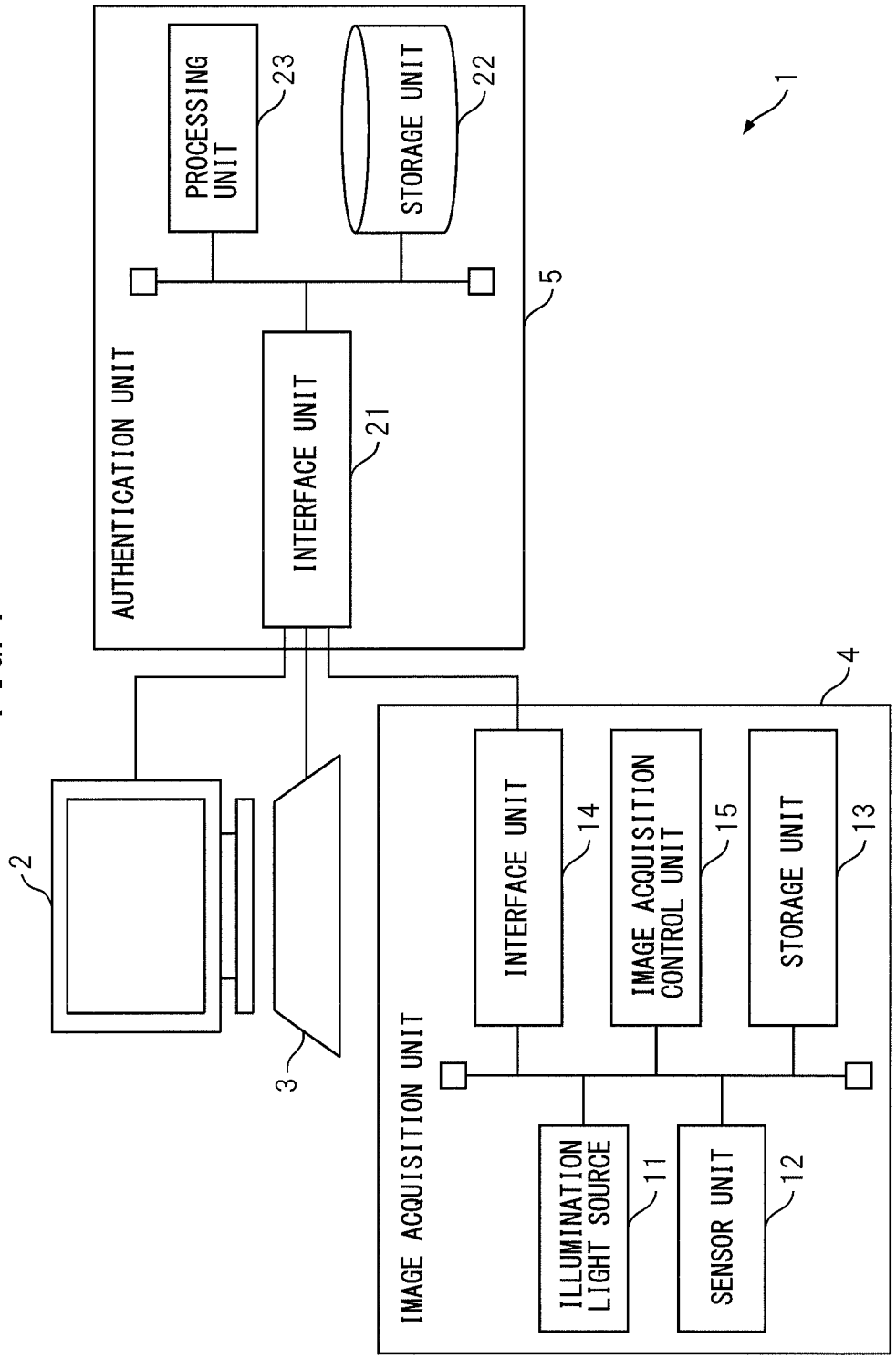
FIG. 1 is a diagram schematically illustrating a configuration of a biometric authentication device according to a first embodiment.

FIG. 1 depicts a schematic configuration diagram of a biometric authentication device according to a first embodiment. A biometric authentication device 1 includes a display unit 2, an input unit 3, an image acquisition unit 4, and an authentication unit 5. The biometric authentication device 1 performs the biometric authentication process using the biometric image representing a palm or finger vein pattern of a user. When the user is authenticated as being one of the registered users which are registered in advance in the biometric authentication device 1 as a result of the biometric authentication, the biometric authentication device 1 permits the user to use an apparatus equipped with the biometric authentication device 1. Alternatively, the biometric authentication device 1 transmits to another apparatus (not depicted) a signal indicating that the user has been authenticated, and permits the user to use the other apparatus.

The display unit 2 includes, for example, a display device such as a liquid crystal display or a CRT monitor. The display unit 2 displays a guidance message for directing the user to place his/her palm or finger properly on the position where the image acquisition unit 4 can correctly acquire the biometric image. The display unit 2 displays the result of the biometric authentication by the authentication unit 5, and so on.

The input unit 3 includes, for example, an operating device, such as a keyboard, a mouse, or a touchpad, which outputs an operation signal in accordance with an operation by the user. The biometric authentication device 1 acquires a command, data, or identification information of the user input by the user through the input unit 3. The input unit 3 transfers the command, data, or identification information of the user to the authentication unit 5. When the user does not need to enter any information other than his biometric information into the biometric authentication apparatus 1, the input unit 3 may be omitted. Note that the display unit 2 and the input unit 3 may be formed by a unified unit as a touch-panel display, for example.

The image acquisition unit 4 generates an illumination image and a non-illumination image about a palm or finger of the user, which serves as an object. The image acquisition unit 4 generates a difference image indicating a difference of luminance values between the correspondence pixels of the illumination image and the non-illumination image, and outputs the difference image to the authentication unit 5. For the purpose, the image acquisition unit 4 includes an illumination light source 11, a sensor unit 12, a storage unit 13, an interface unit 14, and an image acquisition control unit 15.

The illumination light source 11 illuminates the object carrying the biometric information. Therefore, the illumination light source 11 includes, for example, at least one light emitting element, such as a light emitting diode, which emits the light with a wavelength corresponding to the sensitivity of wavelength of imaging elements included in the sensor unit 12, and a drive circuit of the light emitting element. The illumination light source 11 is, for example, arranged around the sensor unit 12, and illuminates the object from the side from which the object is photographed by the sensor unit 12.

The illumination light source 11 is turned on or turned off in accordance with a control signal from the image acquisition control unit 15.

The sensor unit 12 generates an illumination image and a non-illumination image by photographing the object according to the exposure time set by the image acquisition control unit 15. In the present embodiment, when the distance from a sensor surface of the sensor unit 12 to the object is within a predetermined range, the sensor unit 12 photographs the object located in the predetermined range so that a characteristic structure of the biometric information on the object can be discriminated on the illumination image. Therefore, the sensor unit 12 includes, for example, a sensor on which solid-state image sensing devices are arranged in two dimensions, and an optical system arranged so that an image of the object located in the above-described predetermined range is formed on the sensor. In addition, the sensor unit 12 may include a shutter arranged between the sensor and the optical system, or in the optical system. The sensor unit 12 transfers the generated illumination image and non-illumination image to the image acquisition control unit 15.

Note that, in order to improve usability in the present embodiment, the image acquisition unit 4 does not include a shading member which prevents the environmental light from irradiating the sensor surface and the object, so that the large range which can photograph the object can be taken. In addition, the image acquisition unit 4 does not need to include a guide member for keeping a relative position of the object to the sensor surface constant. Accordingly, the volume for installation of the image acquisition unit 4 is small.

The storage unit 13 includes a semiconductor memory, for example. The storage unit 13 stores the latest illumination image and non-illumination image. In addition, the storage unit 13 stores the difference image generated by the image acquisition control unit 15 during a period in which the image acquisition unit 4 is requested an image acquisition from the authentication unit 5. Furthermore, the storage unit 13 stores reference exposure time $E_0$ and exposure time E at the time of generating the illumination image. Further, the storage unit 13 stores a computer program executed by the image acquisition control unit 15.

The interface unit 14 connects the image acquisition unit 4 and the authentication unit 5, and transmits or receives data or various kinds of signals between the image acquisition unit 4 and the authentication unit 5. Therefore, the interface unit 14 includes, for example, an interface circuit according to serial bus standards, such as USB.

When the interface unit 14 receives a control signal, such as an image acquisition request signal, from the authentication unit 5, the interface unit 14 transfers the control signal to the image acquisition control unit 15. The interface unit 14 transmits the difference image received from the image acquisition control unit 15 to the authentication unit 5.

The image acquisition control unit 15 includes one or a plurality of processors, and periphery circuits thereof. When the image acquisition control unit 15 receives the image acquisition request signal from the authentication unit 5, the image acquisition control unit 15 adjusts the exposure time, and controls the illumination light source 11 in accordance with the exposure time. The image acquisition control unit 15 generates the difference image based on the illumination image and the non-illumination image which are received from the sensor unit 12.

Figure 2:
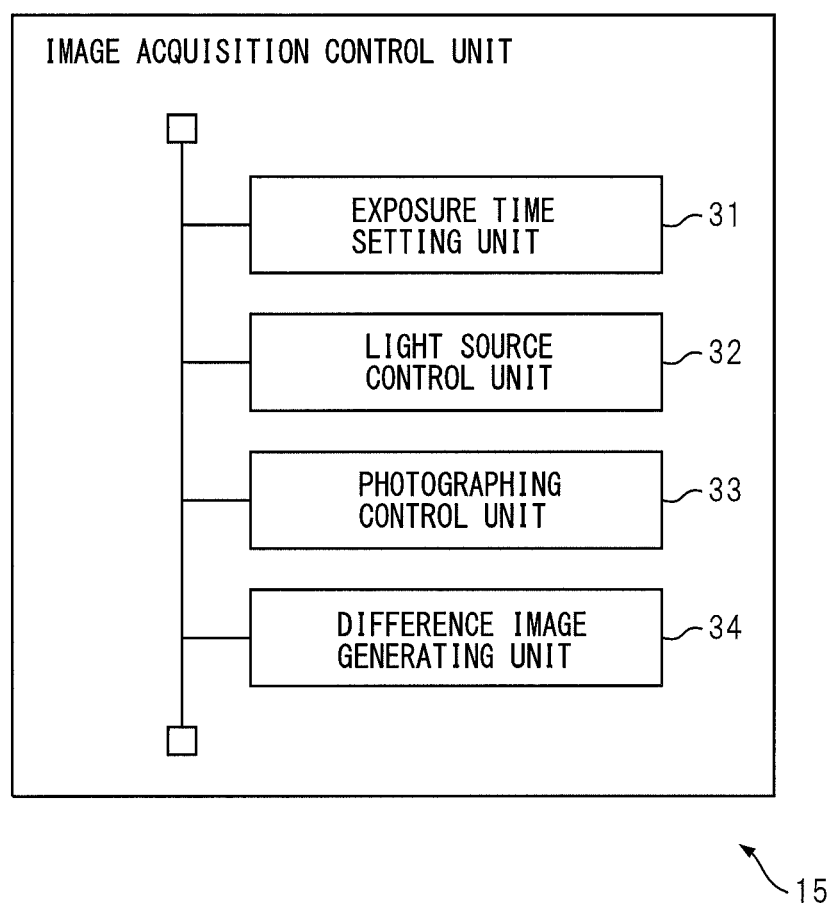
FIG. 2 is a functional block diagram of an image acquisition control unit.

FIG. 2 is a functional block diagram of the image acquisition control unit 15. The image acquisition control unit 15 includes an exposure time setting unit 31, a light source control unit 32, a photographing control unit 33, and a difference image generating unit 34. These units included in the image acquisition control unit 15 are functional modules realized by executing a computer program on the processor incorporated in the image acquisition control unit 15. Alternatively, these units in the image acquisition control unit 15 may be implemented by separate circuits, respectively, in the image acquisition control unit 15.

In order to prevent the luminance value of the part corresponding to the object from being saturated on the illumination image due to excessive exposure time, the exposure time setting unit 31 sets the exposure time for the next illumination image to be generated based on the illumination image obtained most recently.

In the present embodiment, when the luminance values of the pixels of equal to or greater than a predetermined number are saturated, at the illumination image obtained most recently, which is stored in the storage unit 13, the exposure time setting unit 31 sets the exposure time E for the illumination image to be generated next to one half of the exposure time which has been set by the time. Note that the predetermined number is set, for example, to the number of pixels corresponding to 2% of the number of pixels in the illumination image. That the luminance value of pixel is saturated refers to the luminance value of the pixel is equal to or greater than the maximum value of possible luminance value or a predetermined value close to the maximum value. For example, when it is assumed that the luminance value of each pixel of the illumination image is represented by any of 0 to 255, and when the luminance value is greater as the value becomes greater, the exposure time setting unit 31 judges that the luminance value of the pixel has been saturated when the luminance value of the pixel is equal to or greater than 240.

An initial value of the exposure time is set, for example, to the reference exposure time $E_0$, $E_0/2$, or $E_0/4$. The reference exposure time $E_0$ is set, for example, to exposure time by which the biometric image suitable for the biometric authentication is obtained by photographing the object in a state where the object exists in a position nearest to the sensor unit 12 within the range capable of photographing, the illumination light source 11 is turned on, and the environmental light does not exist.

The exposure time setting unit 31 notifies the set exposure time to the photographing control unit 33. In addition, the exposure time setting unit 31 may notify the exposure time to the light source control unit 32.

The light source control unit 32 alternately turns on and off the illumination light source 11 for every predetermined period by transmitting control signals to the illumination light source 11, after the image acquisition unit 4 receives an image acquisition request until receiving an authentication completion signal. The predetermined period can be set to the period, which is longer than the currently set exposure time, and in which a plurality of illumination images and non-illumination images can be photographed while the object remain still. For example, the reference exposure time $E_0$ can be set as the predetermined period. Alternatively, the predetermined period may be the currently set exposure time, or a value obtained by adding a predetermined offset to the currently set exposure time, for example. Furthermore, the predetermined period may be set in accordance with the performance of the imaging elements provided in the sensor unit 12. For example, when an image generation rate by the imaging elements is set in advance to 30 frames per second, the predetermined period may be set to 1/30 seconds, and the illumination light source 11 may repeat turning on and off for every 1/30 second.

The light source control unit 32 notifies the timing for turning on the illumination light source 11, and the timing for turning off the illumination light source 11, to the photographing control unit 33.

The photographing control unit 33 causes the sensor unit 12 to synchronize with the timing of turning on and off the illumination light source 11, and to generate an image. In the present embodiment, when the photographing control unit 33 receives a signal indicating the timing of turning on the illumination light source 11 from the light source control unit 32, the photographing control unit 33 transmits a control signal to the sensor unit 12, to photograph the object with the set exposure time E while the illumination light source 11 is turned on. Then, the photographing control unit 33 receives the image photographed by the sensor unit 12 according to the control signal from the sensor unit 12 as the illumination image. Moreover, when the photographing control unit 33 receives a signal indicating the timing of turning off the illumination light source 11 from the light source control unit 32, the photographing control unit 33 transmits a control signal to the sensor unit 12 to photograph the object with the set exposure time E while the illumination light source 11 is turned off. Then, the photographing control unit 33 receives the image photographed by the sensor unit 12 according to the control signal from the sensor unit 12 as the non-illumination image.

The photographing control unit 33 stores the illumination image and the non-illumination image in the storage unit 13. In addition, the photographing control unit 33 transfers the illumination image and the non-illumination image to the difference image generating unit 34.

The difference image generating unit 34 generates the difference image indicating the difference of the luminance values of respective pixels between the illumination image and the non-illumination image. For example, for every pixel of the difference image, the difference image generating unit 34 sets a value of a pixel of the difference image to a value obtained by subtracting, from the luminance value of the corresponding pixel of the illumination image, the luminance value of corresponding pixel of the non-illumination image generated right before or right after the illumination image.

Generally, a lighting cycle of the illumination light source 11 is shorter enough than the period that the amount of environmental light changing can be detected by the sensor unit 12. Therefore, an average value of components of the environmental light included in the luminance values of the respective pixels of the illumination image is equal to an average value of components of the environmental light included in the luminance values of the respective pixels of the non-illumination image generated right before or right after the illumination image. Even when the environmental light exists at the time of generating the illumination image and the non-illumination image, the component of the environmental light is mostly removed from the luminance value of each pixel in the difference image, and the luminance value of each pixel of the difference image is nearly equal to the luminance value when illuminating the object only by the illumination light source 11. However, as described below, the luminance value of each pixel of the difference image includes not only a noise component according to fluctuation resulting from illumination light emitted by the illumination light source 11, but also a noise component according to fluctuation resulting from the environmental light. Therefore, in the present embodiment, the number of integration of the difference images for generating the biometric image is determined so that the influence to the luminance value of each pixel by these noise components decreases. Note that the details of the determination of the number of integration will be described below.

The image acquisition control unit 15 stores to the storage unit 13, the generated difference image and the exposure time E at the time of generating the difference image. In addition, the image acquisition control unit 15 transmits the difference image and the exposure time E at the time of generating the difference image to the authentication unit 5 through the interface unit 14.

Note that the image acquisition control unit 15 may transmit an exposure time dividing number M ($=E_0/E$) which is a ratio of the reference exposure time $E_0$ to the exposure time E to the authentication unit 5, instead of or in addition to the exposure time E.

Figure 3:
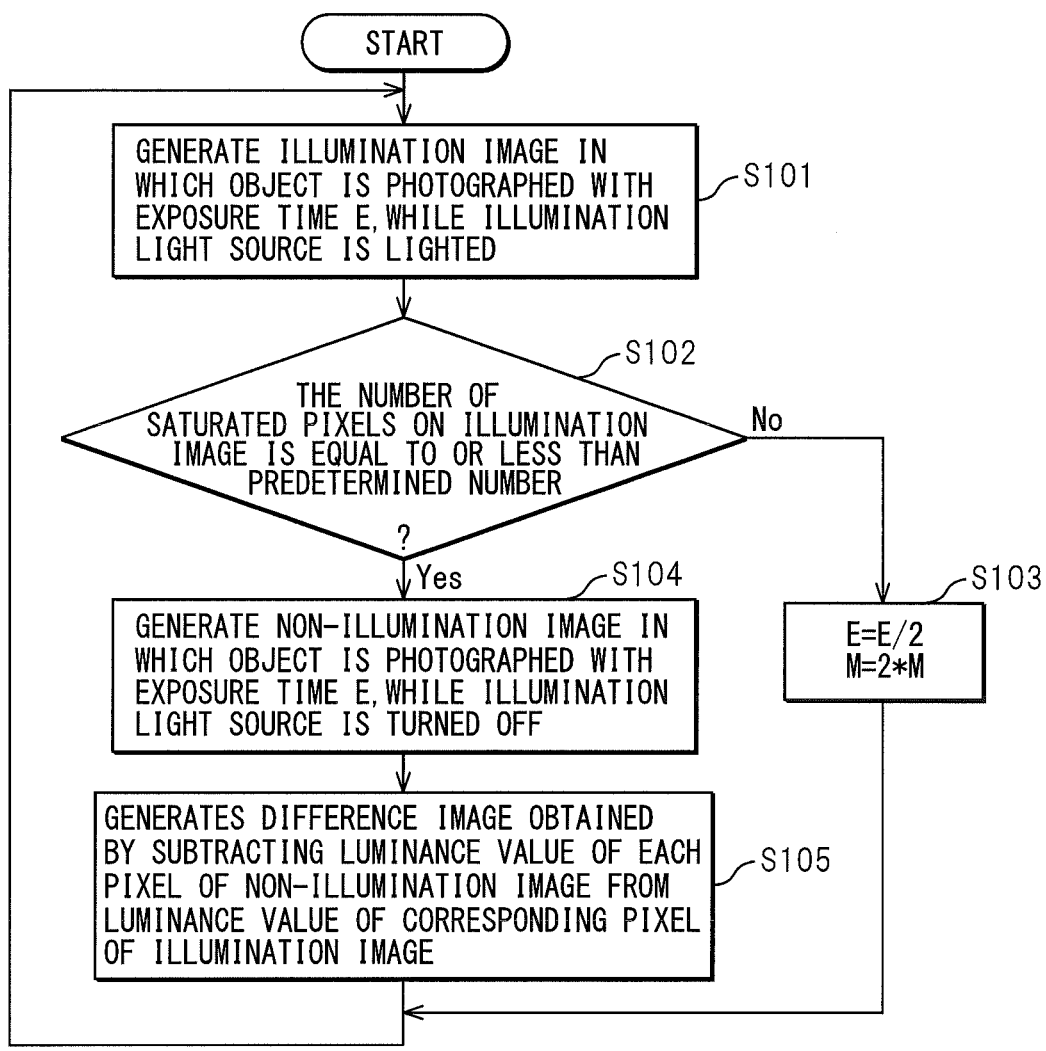
FIG. 3 is an operational flowchart of a difference image generating process.

FIG. 3 is an operational flowchart of the difference image generation process according to the image acquisition unit 4, controlled by the image acquisition control unit 15. The image acquisition unit 4 generates the difference image repeatedly in accordance with the operational flowchart, after the image acquisition unit 4 receives the image acquisition request until it receives the authentication completion signal.

The photographing control unit 33 causes the sensor unit 12 to generate the illumination image in which the object is photographed with the exposure time E, while the illumination light source is turned on (step S101). Then, the photographing control unit 33 receives the illumination image from the sensor unit 12, and stores the illumination image in the storage unit 13.

The exposure time setting unit 31 judges whether or not the number of saturated pixels on the latest illumination image stored in the storage unit 13 is equal to or less than a predetermined number (step S102).

When the number of saturated pixels are greater than the predetermined number (step S102—No), the exposure time setting unit 31 deletes the latest illumination image from the storage unit 13. The exposure time setting unit 31 sets the exposure time E to one half thereof (step S103). Moreover, the exposure time setting unit 31 doubles the exposure time dividing number M. Then, the exposure time setting unit 31 notifies the changed exposure time E to the photographing control unit 33. After that, the image acquisition control unit 15 repeats the processes subsequent to step S101.

On the other hand, when the number of saturated pixels is equal to or less than the predetermined number (step S102—Yes), the photographing control unit 33 causes the sensor unit 12 to generate the non-illumination image in which the object is photographed with the exposure time E, while the illumination light source is turned off (step S104). Then, the photographing control unit 33 store the non-illumination image received from the sensor unit 12 in the storage unit 13, and transfers the non-illumination image to the difference image generating unit 34.

The difference image generating unit 34 generates the difference image, the value of each pixel of the difference image being obtained by subtracting the luminance value of the corresponding pixel of the latest non-illumination image from the luminance value of the corresponding pixel of the latest illumination image read from the storage unit 13 (step S105). The image acquisition control unit 15 stores the difference image in the storage unit 13. In addition, the image acquisition control unit 15 transmits the difference image, and the exposure time E or the exposure time dividing number M at the time of generating the difference image to the authentication unit 5 through the interface unit 14.

Then, the image acquisition control unit 15 terminates the difference image generation process.

The authentication unit 5 generates the biometric image representing the biometric information of the user by integrating a plurality of difference images received from the image acquisition unit 4. When registering the biometric information of the user into the biometric authentication device 1, the authentication unit 5 extracts the data regarding the biometric information of the user from the biometric image, and associates the data with identification information of the user received from the input unit 3 to stores the data.

When performing the biometric authentication process, the authentication unit 5 extracts the data regarding the biometric information of the user from the biometric image, and by using the data, compares the biometric information of the registered user registered in the biometric authentication device 1 with the biometric information of the user. Then, when the authentication unit 5 judges that both information matches, the authentication unit 5 authenticates the user as a legitimate registered user.

To realize such processes, the authentication unit 5 includes an interface unit 21, a storage unit 22, and a processing unit 23.

The interface unit 21 connects the image acquisition unit 4 to the authentication unit 5, and transmits or receives data or various kinds of signals between the image acquisition unit 4 and the authentication unit 5. Therefore, the interface unit 21 includes, for example, an interface circuit according to serial bus standards, such as USB.

When the interface unit 21 receives a control signal, such as the image acquisition request signal, from the processing unit 23, the interface unit 21 transmits the control signal to the image acquisition unit 4. When the interface unit 21 receives the difference image, and the exposure time E or the exposure time dividing number M from the image acquisition unit 4, the interface unit 21 transfers the difference image, and the exposure time E or the exposure time dividing number M to the processing unit 23.

In addition, the interface unit 21 includes an interface circuit for connecting the display unit 2 and the input unit 3 with the authentication unit 5. The interface unit 21 transmits, to the display unit 2, a signal including various kinds of information received from the processing unit 23 to be displayed on the display unit 2. The interface unit 21 receives an operation signal including identification information of the user or the like from the input unit 3, and transfers the operation signal to the processing unit 23.

The storage unit 22 is provided with, for example, a semiconductor memory, a magnetic disk unit, or an optical disc unit. The storage unit 22 stores an application program to be used in the authentication unit 5, the identification information and personal setting information of at least one registered user, and various kinds of data. The storage unit 22 further stores a program for carrying out the biometric authentication process. Furthermore, for each registered user, the storage unit 22 stores data concerning the registered biometric information of the registered user. In the present embodiment, the data concerning the registered biometric information can be the registered biometric image which is an image obtained by photographing the object carrying the biometric information of the registered user, for example, either the right or the left hand, or a specific finger, or partial region thereof. Alternatively, the data concerning the registered biometric information may be features extracted for matching purposes from the registered biometric image.

The storage unit 22 also stores the guidance message for prompting the user to place his/her palm or finger properly on the position where the image acquisition unit 4 can correctly acquire the biometric image.

The processing unit 23 includes one or a plurality of processors, and periphery circuits thereof. The processing unit 23 generates the biometric image based on the difference image acquired from the image acquisition unit 4. Then, the processing unit 23 performs the biometric authentication process based on the biometric image.

Figure 4:
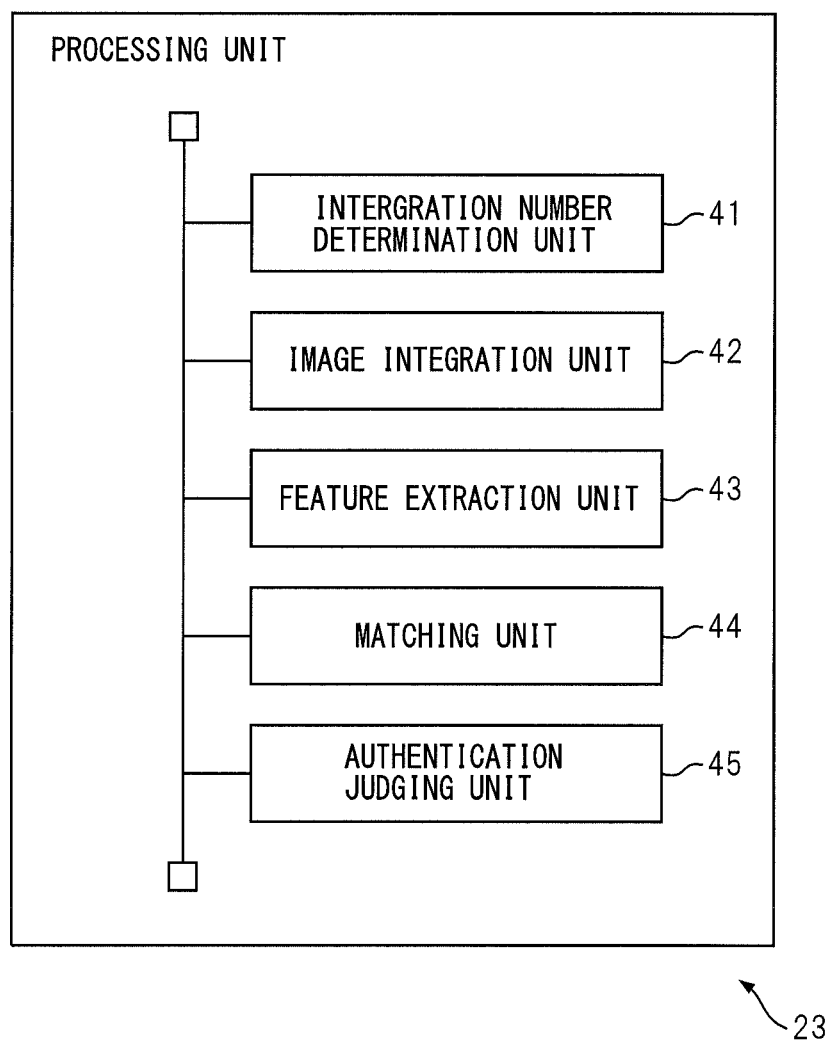
FIG. 4 is a functional block diagram of a processing unit of an authentication unit.

FIG. 4 is a functional block diagram of the processing unit 23. The processing unit 23 is an example of a biometric image generating unit, and includes an integration number determination unit 41, an image integration unit 42, a feature extracting unit 43, a matching unit 44, and an authentication judging unit 45. These units included in the processing unit 23 are functional modules realized by executing a computer program on the processor incorporated in the processing unit 23. Alternatively, these units in the processing unit 23 may be implemented in the authentication unit 5 as separate circuits, respectively, or as an integrated circuit, which realizes the function of each unit.

The integration number determination unit 41 determines the integration number which is the number of the difference images to be integrated in order to generate the biometric image, based on a statistical value of the luminance values of the pixels on the difference image representing the amount of the noise superimposed on the difference image. In the present embodiment, in order to enable photographing of the object in a predetermined range from the sensor surface of the sensor unit 12 of the image acquisition unit 4, a shading member which prevents the environmental light from illuminating the sensor surface and the object is not provided in the image acquisition unit 4. Therefore, the noise component resulting from the environmental light may be included in the luminance value of each pixel of the difference image.

Figure 5A:
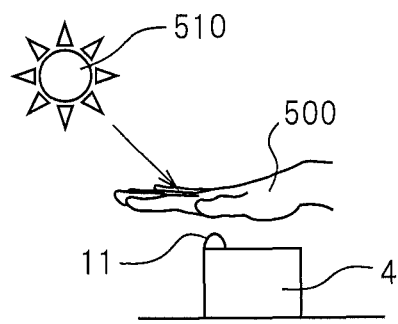
FIG. 5A is a drawing depicting an example of a spatial relationship between an object and an image acquisition unit.
Figure 5B:
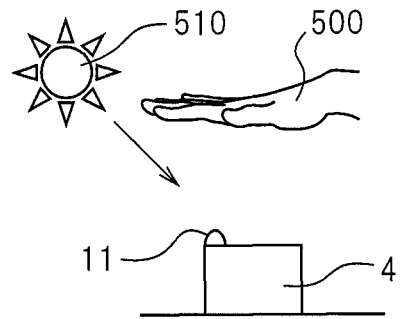
FIG. 5B is a drawing depicting another example of the spatial relationship of the object and the image acquisition unit.

FIGS. 5A and 5B are drawings depicting examples of spatial relationship of the object and the image acquisition unit 4. As depicted in FIG. 5A, when object 500 is located near the image acquisition unit 4, the light from an environmental light source 510 is interrupted by the object 500. In addition, the amount of light emitted from the illumination light source 11 and reflected by the object 500 is large. Therefore, a ratio of the components of the environmental light to the luminance values of respective pixels of the illumination image is relatively small, and thereby the influence of the noise resulting from the environmental light on the luminance value of each pixel of the illumination image is small.

On the other hand, as depicted in FIG. 5B, when the object 500 is separately located from the image acquisition unit 4, the amount of light emitted from the illumination light source 11 and reflected by the object 500 is small. In addition, the light from the environmental light source 510 may be directly incident onto the image acquisition unit 4. Therefore, a ratio of the components of the environmental light to the luminance values of respective pixels of the illumination image is relatively large, and thereby the influence of the noise resulting from the environmental light on the luminance value of each pixel of the illumination image is large.

The noise due to the environmental light will be described below.

Distribution of probability that photons are detected at an arbitrary pixel of the sensor unit 11 is represented by binomial distribution. The binomial distribution can be approximated by a normal distribution when a trial frequency n is sufficiently large. Therefore, the distribution of the probability that photons are detected is represented by the following equation, where n represents the trial frequency and p represents the probability that photons are detected.

$$N(np, np(1-p)) \quad (1)$$

Note that N (a, b) represents the normal distribution of variables with an average "a" and a variance "b". The trial frequency n corresponds to the exposure time E. Therefore, it can be considered that the luminance value of a pixel follows the normal distribution with the average np and the variance npq (where q=1−p).

Therefore, when the object is illuminated only by the illumination light emitted from the illumination light source 11, the distribution of the luminance values of pixels is represented by the following equation, where the average value of the luminance values is represented by $X_0$ and the variance thereof is represented by $S_0^2$.

$$N(x_0, s_0^2) \quad (2)$$

On the other hand, when the object is illuminated only by the environmental light, the distribution of the luminance values of pixels is represented by the following equation, where the average value of the luminance values is represented by $x_1$ and the variance thereof is represented by $S_1^2$.

$$N(x_1, s_1^2) \quad (3)$$

In the illumination image, the luminance value of a pixel includes a component resulting from the illumination light and a component resulting from the environmental light. On the other hand, in the non-illumination image, the luminance value of a pixel includes only the component resulting from the environmental light. The component of the luminance value resulting from the environmental light, and the component of the luminance value resulting from the illumination light follow distributions which are independent from one another, since light sources of the environmental light and illumination light are different. Furthermore, in a short period as a period during which the illumination image and the non-illumination image are generated, it can be assumed that there is no time dependency in change of the luminance value due to the environmental light. Therefore, distribution of the luminance values of the pixels in the difference image is represented by the following equation according to the additivity of a normal distribution.

$$N(x_0, s_0^2 + 2s_1^2) \quad (4)$$

In the difference image, as represented by equation (4), the variance is twice the value of variance resulting from the environmental light ($2s_1^2$) larger than the variance of the luminance values only resulting from the illumination light. A fluctuation of the luminance values according to the variance is observed as a noise on the difference image. Therefore, as the amount of variance increases, the amount of noise superimposed on the difference image increases. Moreover, as the luminance value resulting from the illumination light decreases, a ratio of the fluctuation of the luminance values resulting from the environmental light to the luminance values of the difference image increases. Therefore, as the intensity of the environmental light increases relative to the intensity of the illumination luminous, the influence of the noise resulting from the environmental light to the luminance value of each pixel of the difference image increases. Therefore, when the integration number of the difference images is too small, the generated biometric image includes relatively many noises, and the biometric image is not suitable for the biometric authentication.

Accordingly, in the present embodiment, the integration number determination unit 41 sets the integration number so that the greater amount of the noise superimposed on the difference image is, the greater integration number is, to be greater luminance value of the object according to the illumination light, thereby reducing the influence of the noise resulting from the environmental light to the luminance value of each pixel in the biometric image.

The integration number determination unit 41 extracts an object region in which the object is actually captured, by applying a binarization to a photographic subject region in which the object may be captured on the difference image. The photographic subject region is set in advance, for example, on the overall difference image or a part of regions of the difference image including the center of the difference image. Note that the photographic subject region may be changeable by an operation signal input from the input unit 3, for example.

A threshold $Th_1$ used for the binarization is determined by the following equation, for example.

$$Th_1 = Th_{10}/M \quad (5)$$

$Th_{10}$ represents a binarization threshold to the difference image generated based on the illumination image photographed with the reference exposure time $E_0$, and is, for example, one half of the maximum value of possible luminance value. Moreover, M represents the exposure time dividing number for the latest difference image.

The integration number determination unit 41 takes a group of pixels each of which has the luminance value equal to or greater than the binarization threshold $Th_1$ in the photographic subject region as the object region.

The integration number determination unit 41 determines the integration number in accordance with any of calculation criteria which are different according to the exposure time dividing number M. When the exposure time dividing number M is equal to or less than a predetermined number, i.e., when the luminance values of the pixels included in the object region in each difference image are high to some extent, a ratio of the luminance value resulting from the illumination light from the illumination light source 11 in the luminance value of each pixel becomes relatively high. Therefore, the difference image is insulated from the influence of the noise resulting from the environmental light. Therefore, when the exposure time dividing number M is equal to or less than the predetermined number, in order to reduce the computation quantity for determining the integration number, the integration number determination unit 41 determines the integration number based on the average value of the luminance values of the pixels in the object region.

On the other hand, when the exposure time dividing number M is larger than the predetermined number, i.e., when the luminance values of the pixels included in the object region in each difference image are low as a whole, the influence of the noise resulting from the environmental light in the luminance value of each pixel becomes large. Therefore, when the exposure time dividing number M is larger than the predetermined number, the integration number determination unit 41 calculates a variance of the luminance values based on a plurality of difference images, and determines the integration number in accordance with the variance. The average value and variance of the luminance values are each an example of the statistical value of the luminance value which represents the amount of the noise superimposed on the difference image.

Note that when the exposure time E of the difference image is notified to the authentication unit 5 from the image acquisition unit 4, the integration number determination unit 41 may calculate $E_0/E$ as the exposure time dividing number M.

The predetermined number is set in advance, for example, in accordance with the noise amount according to which the influence of the precision on the biometric authentication from the noise of an image falls within tolerance level, i.e., in accordance with the maximum of variance of the luminance values of the difference image. For example, by evaluating the precision of the biometric authentication process using a plurality of biometric images on which various noises are superimposed, the amount of the noise corresponding to the permission lower limit of the precision is calculated in advance. Then, for example, the noise amount is calculated from a plurality of difference images generated by variously changing the intensity and the exposure time dividing number of the environmental light. The exposure time dividing number, the noise mount of which corresponds to the permission lower limit of precision, is set as the predetermined number. For example, the predetermined number is set to 8.

When the integration number is determined based on the average value of the luminance values of the pixels in the object region, as the average value of the luminance values decreases, a ratio of a component of the luminance value from the noise superimposed on the difference image to the luminance values of respective pixels increases. Therefore, the integration number determination unit 41 determines the integration number N by the following equation for example, so that the integration number increases as the average value of the luminance values decreases.

$$N=I_0/I_{av} \quad (6)$$

For example, $I_0$ is an expected value of an average luminance value of the pixels in the object region in the image obtained by photographing the object in a state where the object is located at a position nearest to the sensor unit 12 of the image acquisition unit 4 within the range capable of photographing the object, the illumination light source 11 is on, and the environmental light does not exist. $I_0$ is determined according to a result of an experiment or a simulation in advance, for example. Moreover, $I_{av}$ is an average value of the luminance values of the pixels in the object region in the latest difference image.

On the other hand, when the integration number is determined based on the variance value of the luminance values of the pixels in the object region, the influence from the noise superimposed on the difference image to the luminance value of each pixel increases, as the variance value of the luminance values increases. Therefore, the integration number determination unit 41 determines the integration number N so that the variance value of the luminance values in the biometric image is equal to or less than the distributed value of the luminance values of the image obtained by photographing the object with the reference exposure period $E_0$ in a state where the environmental light does not exist and the object is illuminated only by the illumination light source 11.

From equation (4), the distribution of the luminance values in the object region is defined by the following equation when the exposure time dividing number is M.

$$N(I_0/M,(s_0^2+2s_1^2)/M) \quad (7)$$

Therefore, the variance of the difference image is represented by $((s_0^2+2s_1^2)/M)$. The variance of the difference image $((s_0^2+2s_1^2)/M)$ is estimated as follows.

Regarding pixels of interest of two images in which the same object is photographed, it is assumed that a luminance value when the noise is not superimposed on the image is represented by I, and luminance components due to a noise is represented by $y_0$ and $y_1$. Moreover, it is assumed that $y_0$ and $y_1$ follow the normal distribution $N(0, V^2)$. In this case, the luminance values $P_0$ and $P_1$ of the pixels of interest of the two images are represented as follows, respectively.

$$P_0=I+y_0$$

$$P_1=I+y_1$$

Therefore, the difference $\Delta P$ of the luminance values of the pixels of interest between the two images is represented as follows.

$$\Delta P=y_0-y_1$$

According to the additivity of a normal distribution, $\Delta P$ follows the normal distribution $N(0, 2v^2)$. Therefore, when the variance of the luminance values of the pixels of the image obtained by the difference between the two images is represented by $V_d^2$, a relationship between $V_d^2$ and $V^2$ is represented as follows.

$$V_d^2=2v^2 \quad (8)$$

The relationship also holds for the variance of the luminance values of the illumination image and the non-illumination image, and the variance of the luminance value of the difference image.

In the present embodiment, in order to keep the values of the various parameters used for the biometric authentication process constant irrespective of the integration number N, a correction coefficient $\alpha$ (=M/N) is multiplied by the luminance value of each pixel of the biometric image, so that the average value of the luminance values of the pixels in the object region in the biometric image is equal to the above-described $I_0$.

Therefore, from equation (7), the luminance value of each pixel of the biometric image follows the normal distribution as follows.

$$N(I_0,(s_0^2+2s_1^2)(M/N)) \quad (9)$$

Referring to the equation (9), as the integration number N increases, the variance $(s_0^2+2S_1^2)(M/N)$ of the luminance values of the biometric image decreases. When applying the relations of the equation (7) and the equation (8) to the variance $(s_0^2+2S_1^2)$ (M/N) of the luminance values of the integration image, a relation of the following equation is derived.

$$(s_0^2 + 2s_1^2)(M/N) = (s_0^2 + 2s_1^2)*(2/M)*(M^2/2N) \qquad (10)$$
$$= v_d^2 * (M^2/2N)$$

$v_d^2$ is the variance of the luminance values in the difference image. Note that the equation (8) also holds for a relationship between an image with each pixel value of which is a difference value between the correspondence pixels of the two difference images, and those difference images. Therefore, $v_d^2$ can be calculated, for example, by applying the equation (8) to the variance of the differences of the luminance values of the correspondence pixels of the latest two difference images, calculated based on the latest two illumination images photographed with the same exposure time.

The integration number determination unit 41 determines the integration number N so that a conditions that the variance of the luminance values of the biometric image is equal to or less than a predetermined threshold value $V_{th}$ is satisfied. In this case, there is the following relationship between the integration number N and the threshold $V_{th}$ from equation (10).

$$v_d^2*(M^2/2N) \leq V_{th} \Leftrightarrow$$

$$N \geq v_d^2*(M^2/2)/V_{th} \qquad (11)$$

Note that, as for the threshold $V_{th}$, for example, the variance $S_0^2$ of the luminance values in the illumination image can be used, the illumination image being photographed in a state where the object is illuminated only by the illumination light from the illumination light source 11 (i.e., in a state where the environmental light does not exist).

The variance $S_0^2$ is determined according to a result of an experiment, for example. Therefore, the integration number determination unit 41 calculates the minimum integration number N that satisfies the equation (11), for example. By determining the threshold $V_{th}$ in this manner, the integration number determination unit 41 can make the fluctuation of the luminance values in the biometric image be equal to or less than fluctuation of the luminance values in the illumination image photographed in a state where the environmental light does not exist.

The integration number determination unit 41 notifies the integration number N to the image integration unit 42.

The image integration unit 42 calculates for the biometric image by integrating the latest difference images of the integration number N.

In the present embodiment, the image integration unit 42 calculates the sum of the luminance values of N sheets of the latest difference images on a pixel-by-pixel basis. Then, the image integration unit 42 takes the value obtained by multiplying the sum of the luminance values by the correction coefficient α (=M/N) as the luminance value of the corresponding pixel of the biometric image on a pixel-by-pixel basis.

Note that when there is a difference image in which the object is moved from a position in the last difference image, the image integration unit 42 may not use, for generating the biometric image, the difference images which are obtained prior to the difference image in which the object is moved. In this case, the image integration unit 42 generates the biometric image by using N sheets of difference images prior to the difference image which is judged that the object has moved.

Alternatively, the image integration unit 42 may skip the difference image which is judged that the object has moved.

The image integration unit 42 calculates, for example, the absolute value of the difference between the luminance values of correspondence pixels between the object region of the difference image of interest and the object region of the last difference image, in order to judge whether or not the object is moved. When the number of pixels, with the absolute value of the difference of the luminance values of the pixels being equal to or greater than a predetermined threshold, is equal to or greater than a predetermined number, the image integration unit 42 judges that the object is moved. Note that the predetermined threshold is set, for example to a value corresponding to 1 to 3 times the standard deviation $s_0$ of the luminance values at the time of photographing the object in a state where the environmental light does not exist. In addition, the predetermined number is set, for example, to 1/10 of the number of pixels included in the object region.

The image integration unit 42 may calculate a cross correlation value between the object region of the difference image of interest, and the object region of the last difference image, in order to judge whether or not the object is moved. Then, the image integration unit 42 may judge that the object is moved, when the cross correlation value is equal to or greater than a predetermined threshold. The image integration unit 42 transfers the generated biometric image to the feature extracting unit 43.

FIG. 6 is an operational flowchart of the biometric image generating process. The processing unit 23 performs the biometric image generating process according to the operational flowchart at the time of execution of the biometric authentication process, or registration of the biometric information.

The integration number determination unit 41 extracts an object region from the latest difference image (step S201). The integration number determination unit 41 judges whether the exposure time dividing number M is equal to or less than the threshold $M_{th}$ (step S202).

When the exposure time dividing number M is equal to or less than the threshold $M_{th}$ (step S202—Yes), the integration number determination unit 41 sets a ratio $(I_0/I_{av})$ between an expected luminance average value $I_0$ of the object and an average luminance value $I_{av}$ of the object region as the integration number N (step S203).

On the other hand, when the exposure time dividing number M is greater than the threshold $M_{th}$ (step S202—No), the integration number determination unit 41 sets the integration number N so that the variance value of the luminance values of the object region is equal to or less than the variance at the time of only self-illumination (step S204). The integration number determination unit 41 notifies the integration number N to the image integration unit 42 after step S203 or step S204.

The image integration unit 42 initializes a counter i, which represents the number of sheets of the integrated difference images, to 1 (step S205). The image integration unit 42 judges whether or not the object is moved between the object region of the latest difference image, and the object region of the last difference image (step S206).

When the object is moved (step S206—Yes), the image integration unit 42 deletes the integrated image in which the difference images are integrated by the time (step S207). Then, the image integration unit 42 repeats the process subsequent to step S205.

On the other hand, when the object is not moved (step S206—No), the image integration unit 42 updates the integrated image by adding the luminance value of each pixel of the difference image of interest to the luminance value of the correspondence pixel of the integrated image. However, when the counter i represents 1, the luminance value of each pixel of the difference image of interest is set to the luminance value of the correspondence pixel of the integrated image. In addition, the image integration unit 42 increments the counter i by 1 (step S208).

After step S208, the image integration unit 42 judges whether or not the value of the counter i exceeds the integration number N (step S209). When the value of counter i is equal to or less than the integration number N (step S209—No), the image integration unit 42 sets the difference image of interest as the last difference image of the current difference image of interest, and repeats the process subsequent to step S206. On the other hand, when the value of counter i is greater than the integration number N (step S209—Yes), the image integration unit 42 corrects the luminance value of each pixel of the integrated image by multiplying the correction coefficient $\alpha$ by the luminance value of each pixel of the integrated image. Then, the image integration unit 42 outputs the corrected integrated image as the biometric image (step S210). After that, the processing unit 23 terminates the biometric image generating process.

The feature extracting unit 43 extracts the features for the matching process from the biometric image at the time of execution of the biometric authentication process, or at the time of registration of the biometric information.

For example, when a vein pattern is used as the biometric information, the feature extracting unit 43 extracts positions of feature points, such as a bifurcation and an ending point of blood vessel, as a feature. Therefore, in order to extract the bifurcation and ending point of the blood vessel from the biometric image, the feature extracting unit 43 binarizes the object region on the biometric image using a partial threshold method for example. Next, the feature extracting unit 43 performs a thinning process to the binarized object region. After that, the feature extracting unit 43 scans the thinned object region by using a plurality of mask patterns, and detects the position on the biometric image where it matches one of the mask patterns. The feature extracting unit 43 takes a center pixel of the detected position as a position of the feature point. Each mask pattern used here is represented, for example, by 3×3 pixels, and has a binary pattern corresponding to the bifurcation or ending point of the blood vessel.

Note that the feature extracting unit 43 may extract other feature quantities, such as a distribution of curve directions of a blood vessel image, and a distribution of the directions of the trunks in the blood vessel image or a frequency which represents an interval and the number of trunks in the blood vessel image.

When registering the biometric information, the feature extracting unit 43 takes the obtained features as data concerning the registered biometric information of the registered user, and stores, in the storage unit 22, the obtained features with the identification information of the registered user obtained through the input unit 3.

On the other hand, the feature extracting unit 43 transfers the obtained features to the matching unit 44, when the biometric authentication process is performed.

As described below, if the matching unit 44 performs a matching method without using the features, a pattern matching for example, the feature extracting unit 43 may be omitted.

The matching unit 44 compares the input biometric information which is the biometric information represented on the input biometric image generated at the time of execution of the biometric authentication process, with the registered biometric information which is registered in advance and corresponds to the identification information of the registered user input through the input unit 3. The matching unit 44 obtains, as a result of the matching process, the degree of similarity indicating the degree to which the input biometric information is similar to the registered biometric information.

For example, the matching unit 44 can calculate the degree of similarity by counting the number of the feature points which matches the feature point, which is extracted from registered biometric information and is stored in the storage unit 22 as the data concerning the registered biometric information, among the feature points extracted from the input biometric image.

In this case, for example, the matching unit 44 selects a feature point located near the center of the object region of the input biometric image as a first reference feature point. Further, the matching unit 44 selects one of the feature points extracted from the registered biometric information as a second reference feature point. Then, the matching unit 44 shifts each feature point extracted from the registered biometric information so as to bring the second reference feature point into registry with the first reference feature point. After that, the matching unit 44 calculates the number of the feature points of the registered biometric information which match the feature point of the input biometric information, while rotating each feature point extracted from registered biometric information. By repeating the above process while changing the combination of the first reference feature point and the second reference feature point, the matching unit 44 obtains the maximum number of feature points on the registered biometric information that match the feature points on the input biometric information.

Finally, the matching unit 44 calculates the degree of similarity by dividing the maximum number of matched feature points by the total number of feature points extracted from the input biometric information. In this case, the degree of similarity takes any value between 0 and 1, and the higher the degree of similarity between the input biometric information and the registered biometric information is, the closer to 1 the value of the degree of similarity is.

Note that, the matching unit 44 may use other various methods which calculate the degree of similarity of the input biometric information and the registered biometric information according to the feature quantities extracted from the input biometric information and the registered biometric information.

The registration biometric image itself which is the biometric image generated at the time of registration of the biometric information, or a part of the registration biometric image may be stored in the storage unit 22 as the data concerning the registered biometric information of the registered user. In this case, the matching unit 44 may calculate the degree of similarity by performing the pattern matching between the input biometric image, and the registration biometric image or a part of the registration biometric image. For example, the matching unit 44 calculates a normalized cross correlation value, while changing a relative position between the input biometric image, and the registration biometric image or a part of the registration biometric image. Then, the matching unit 44 takes the maximum value of the normalized cross correlation value as the degree of similarity.

The matching unit 44 notifies the degree of similarity to the authentication judging unit 45.

The authentication judging unit 45 judges whether or not the degree of similarity calculated by the matching unit 44 is equal to or greater than a predetermined authentication threshold.

When the degree of similarity is equal to or greater than the predetermined authentication threshold, the authentication judging unit 45 judges that the input biometric information matches the registered biometric information. Then, the authentication judging unit 45 authenticates the user as a legitimate registered user corresponding to the registered biometric information which is judged to match the input biometric information. When the user is authenticated, the authentication judging unit 45 reports the result of the authentication to the processing unit 23. Then, the processing unit 23 permits the authenticated user to use the apparatus equipped with the biometric authentication device 1 or the apparatus connected to the biometric authentication device 1.

On the other hand, when the degree of similarity is less than the authentication threshold value, the authentication judging unit 45 judges that the input biometric information does not match the registered biometric information. In this case, the authentication judging unit 45 does not authenticate the user. The authentication judging unit 45 reports the result of the authentication indicating the failure to authenticate the user to the processing unit 23. Then, the processing unit 23 denies the unauthenticated user an access to the apparatus equipped with the biometric authentication device 1 or the apparatus connected to the biometric authentication device 1. Further, the processing unit 23 displays on the display unit 2, a message indicating that the authentication has failed.

It is preferable to set the authentication threshold value to such a value that the authentication judging unit 45 succeeds to authenticate the user only when the user is a legitimate registered user. It is also preferable to set the authentication threshold value to such a value that the authentication judging unit 45 fails to authenticate the user when the user is a person other than a legitimate registered user. For example, the authentication threshold value may be determined by multiplying the difference between the maximum and minimum values that the degree of similarity can take by 0.7 and adding the resulting product to the minimum value of the degree of similarity.

FIG. 7 is an operation flowchart of the biometric authentication process which is performed under the control of a computer program executed on the processing unit 23.

As depicted in FIG. 7, the processing unit 23 generates the input biometric image representing the biometric information of the user being a subject of the biometric authentication process, by using a plurality of difference images received from the image acquisition unit 4 (step S301). The processing unit 23 transfers the input biometric image to the feature extracting unit 43. The feature extracting unit 43 extracts the features of the input biometric information from the input biometric image (step S302). Then, the feature extracting unit 43 transfers the features of the input biometric information to the matching unit 44.

The processing unit 23 reads, from the storage unit 22, the data concerning the registered biometric information of the registered user corresponding to the identification information of the registered user, which is received through the input unit 3 (step S303). The data concerning the registered biometric information includes, for example, the features of the registered biometric information extracted from the registration biometric image. The processing unit 23 transfers the features of the registered biometric information included in data concerning the registered biometric information to the matching unit 44.

The matching unit 44 calculates the degree of similarity between the input biometric information and the registered biometric information, based on the features of the input biometric information and the features of the registered biometric information (step S304). Then, the matching unit 44 transfers the degree of similarity to the authentication judging unit 45.

The authentication judging unit 45 judges whether or not the degree of similarity is equal to or greater than the predetermined authentication threshold value (step S305). When the degree of similarity is equal to or greater than the authentication threshold value (step S305—Yes), the authentication judging unit 45 authenticates the user as the legitimate registered user (step S306).

On the other hand, if the degree of similarity is less than the authentication threshold value (step S305—No), the authentication judging unit 45 does not authenticate the user (step S307).

After step S306 or step S307, the processing unit 23 transmits the authentication completion signal to the image acquisition unit 4, and terminates the biometric authentication process.

As has been described above, since the biometric authentication device according to the first embodiment uses, for the biometric authentication process, the biometric image obtained by integrating a plurality of difference images between the illumination images and the non-illumination images, it is possible to suppress the saturation of the luminance value resulting from the environmental light. In addition, the biometric authentication device determines the integration number so as to reduce a ratio of fluctuation of the luminance values resulting from a noise to the overall luminance values, based on the statistical value of the luminance values of the pixels of the difference image representing the amount of the noise superimposed on the difference image. Therefore, even when the distance between the image acquisition unit and the object is not constant, the biometric authentication device can generate the biometric image suitable for the biometric authentication. Since the biometric authentication device performs the biometric authentication process using the biometric image, it is possible to reduce the error of the features resulting from a noise, and thereby improving a precision of the biometric authentication.

A biometric authentication device according to a subsequent second embodiment will be described. The biometric authentication device generates the illumination image and the non-illumination image so that an object carrying the biometric information of a plurality of users is captured in the illumination image and the non-illumination image, respectively. The biometric authentication device generates the biometric image suitable for the biometric authentication for each object by determining the integration number of the difference image for each object.

For example, in order to improve a user's convenience or to improve security level, it may be preferable that the biometric authentication device performs the biometric authentication to each of biometric information items of a plurality of users. In addition, it may be preferable that the biometric authentication device performs the biometric authentication using the biometric information of one user, and uses the biometric information of other users for other purpose.

For example, when the biometric authentication device is applied to an entrance and exit management apparatus, the biometric authentication device temporarily registers the biometric information of a temporal user who is a user temporarily admitted to enter a specified section. In that case, the biometric authentication device photographs the biometric information of the registered user who has been registered and the biometric information of the temporal user at the same time. When the biometric authentication device performs the biometric authentication process using the biometric information of the registered user captured in the image, and authenticates the registered user, the biometric information of the temporal user which is captured in the image is registered. Accordingly, the biometric authentication device needs to only one photographing for acquiring the biometric information of two users, and therefore it is possible to save the time and effort of the two users comparing to a case of separately photographing the biometric information of the two users.

Alternatively, the biometric authentication device permits to enter the specified section only when the two users are authenticated. In this case, the biometric authentication device photographs the biometric information of two users at the same time to generate an image in which the biometric information of the two users is captured, and performs the biometric authentication process to each biometric information item captured on the image, thereby reducing processing time rather than a case of separately photographing the biometric information for respective users.

However, a distance from the image acquisition unit to the object carrying the biometric information may be different depending on the objects. In particular, when any of the users is not familiar with such reading of biometric information, the user does not know where to put the object carrying the biometric information, and therefore the distance between the object and the image acquisition unit may be different depending on the objects increases. When the distance from the image acquisition unit to the object is different, an intensity of illumination of the illumination light emitted from the illumination light source is different depending on the objects. Therefore, the average value of the luminance values of the pixels corresponding to an object close to the image acquisition unit among a plurality of objects captured in the difference image is greater than the average value of the luminance values of the pixels corresponding to an object far from the image acquisition unit.

The biometric authentication device according to the second embodiment determines the integration number for each object region, by calculating a statistical value of a luminance value for each object region on which the object is captured on the difference image.

Note that a configuration of the biometric authentication device according to the second embodiment is the same as the configuration of the biometric authentication device according to the first embodiment, and therefore, FIG. 1 is referred regarding the configuration of the biometric authentication device according to the second embodiment. In addition, FIG. 2 is referred regarding each unit included in the image acquisition control unit 15 of the image acquisition unit 4.

Regarding the biometric authentication device according to second embodiment, description will be made below about differences from the biometric authentication device according to the first embodiment.

The storage unit 13 of the image acquisition unit 4 stores the illumination image, the non-illumination image, the difference image and the like, as is the case with the first embodiment. The storage unit 13 further stores an exposure time setting table which represents a relationship between the number of pixels, each luminance value of which is saturated, and the exposure time. Then, the exposure time setting unit 31 refers to the exposure time setting table and sets the exposure time corresponding to the number of pixels, the luminance values of which are saturated, in the illumination image acquired most recently as the exposure time for the illumination image to be generated thereafter.

Figure 8:
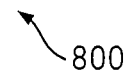
FIG. 8 depicts an example of an exposure time setting table.

FIG. 8 depicts an example of the exposure time setting table. In each field on a left side column in the exposure time setting table 800, a range of the number of pixels, the luminance values of which are saturated, are depicted. On the other hand, the exposure time is depicted in each field of a right side column. For example, when the number of pixels, the luminance values of which are saturated, in the illumination image acquired most recently is 0 or more to 100 or less, the exposure time setting unit 31 sets the exposure time to $E_0$. When the number of pixels, the luminance values of which are saturated, in the illumination image acquired most recently is 101 or more to 200 or less, the exposure time setting unit 31 sets the exposure time to $E_1$. Note that a relationship between the number of pixels, the luminance values of which are saturated, and the exposure time is determined in advance according to a result of an experiment, for example. The exposure time setting unit 31 determines the exposure time with reference to the exposure time setting table, and thereby the optimal exposure time can be determined quickly under environmental light.

The image acquisition unit 4 generates the difference image in which a plurality of objects are captured, by using the illumination image photographed with the exposure time determined with reference to the exposure time setting table. Then, whenever the image acquisition unit 4 generates the difference image, the image acquisition unit 4 transmits the difference image to the authentication unit 5.

Figure 9:
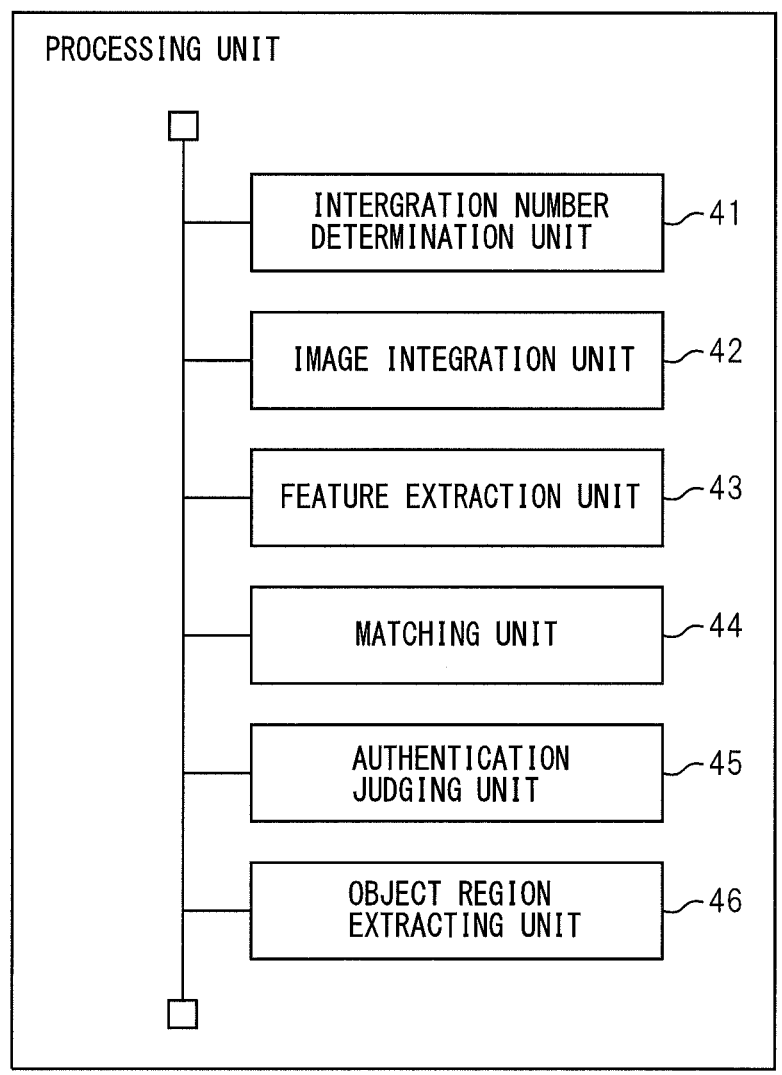
FIG. 9 is a functional block diagram of the processing unit of the authentication unit according to a second embodiment.

FIG. 9 is a functional block diagram of the processing unit 23 of the authentication unit 5 according to the second embodiment. The processing unit 23 includes an object region extracting unit 46, an integration number determination unit 41, an image integration unit 42, a feature extracting unit 43, a matching unit 44, and an authentication judging unit 45. These units included in the processing unit 23 are functional modules realized by executing a computer program on the processor incorporated in the processing unit 23. Alternatively, these units in the processing unit 23 may be implemented in the authentication unit 5 as separate circuits, respectively, or an integrated circuit, which realizes the function of each unit.

The object region extracting unit 46 extracts each region in which each of a plurality of objects is captured from the latest difference image. For example, the object region extracting unit 46 binarizes each pixel value of the difference image by using a predetermined binarization threshold so that object candidate pixels, the values of which are equal to or greater than the binarization threshold, has different values from values of other pixels. The binarization threshold may be, for example, a value set in advance according to a result of an experiment so that the pixels on which the object is captured are distinguishable from other pixels, or may be set to a predetermined statistical value, such as average value, of the luminance values of the difference image. Note that the object region extracting unit 46 may determine the binarization threshold for each part of the difference image using a local thresholding method or the like.

The object region extracting unit 46 calculates a plurality of object candidate regions where the object candidate pixels are connected by performing a labeling processing on the object candidate pixels. The object region extracting unit 46 selects a region including the pixels, the number of which is equal to or greater than a predetermined number of pixels, among the object candidate regions. Alternatively, the object region extracting unit 46 may select the object candidate regions, the number of which corresponds to the number of the objects expected to be captured in one difference image, for example two object candidate regions in decreasing order of the number of pixels.

For each selected object candidate region, the object region extracting unit 46 calculates a circumscription rectangle of the object candidate region, and takes the circumscription rectangle as the object region in which the object is captured. The object region extracting unit 46 stores the information representing the range of the object region, such as coordinates of an upper left end pixel and a lower right end pixel of the object region, with the identification number of the object region in an object region information table memorized in the storage unit 22.

The integration number determination unit 41 determines the integration number for integrating the difference images for each object region. In the present embodiment, the integration number determination unit 41 calculates the variance values of the luminance values for each object region. For each object region, the integration number determination unit 41 takes the minimum integration number that satisfies equation (11) as the integration number for the object region. The integration number determination unit 41 stores the integration number and variance value of each object region in the object region information table memorized in the storage unit 22.

Figures 10, 11:
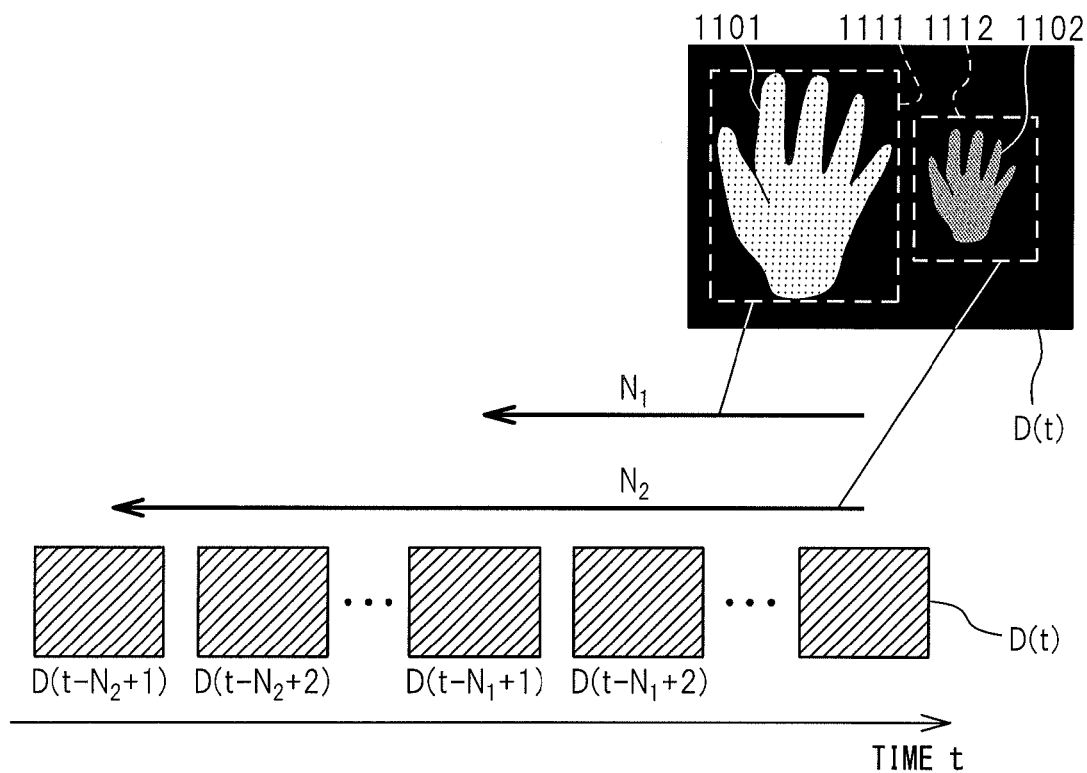
FIG. 10 depicts an example of an object region information table.
FIG. 11 is a drawing depicting a relation between two objects captured in a difference image, and a difference image used for generating an integration image to each object.

FIG. 10 depicts an example of the object region information table. In the object region information table 1000, one object region information item is stored in one line. From the column on left side, the identification number of the object region, the coordinate value representing the range of the object region, the variance value and the integration number are depicted.

With reference to the object region information table, the image integration unit 42 generates the integrated image for each object region, by integrating the difference images, the number of which is the integration number calculated for each object region.

FIG. 11 is a drawing depicting a relationship between two objects captured in the difference image, and the difference images used for generating the integration image to each object.

At FIG. 11, two objects 1101 and 1102 are captured in the latest difference image D (t). The object 1102 is farther than the object 1101 from the sensor unit of the image acquisition unit 4. Therefore, the influence from the environmental light in the luminance values of the object region 1112 in which the object 1102 is captured is greater than the influence from the environmental light in the luminance values of the object region 1111 in which the object 1101 is captured. Therefore, the integration number $N_2$ for the object region 1112 is greater than the integration number $N_1$ for the object region 1111.

Therefore, the integrated image for the object region 1111 is generated by using images from difference image D(t) to the difference image D(t−N1+1), and on the other hand, the integrated image for the object region 1112 is generated by using images from difference image D(t) to the difference image D(t−N2+1).

For each object region, the image integration unit 42 generates the biometric image of the object captured in the object region, by integrating the difference images, the number of which is the integration number set for the object region.

FIG. 12 is an operational flowchart of the biometric image generating process according to the second embodiment. The processing unit 23 performs the biometric image generating process according to the operational flowchart at the time of execution of the biometric authentication process, or at the time of registration of the biometric information.

The object region extracting unit 46 extracts, for each object, the object region in which the object is captured from the difference image (step S401). For each object region, the integration number determination unit 41 sets the integration number N so that the variance of the luminance values of the object region is equal to or less than the variance at the time of only self-illumination (step S402).

The integration number determination unit 41 stores the integration number of each object region in the storage unit 22.

The processing unit 23 sets the object region of interest (step S403). The image integration unit 42 initializes the counter i representing the number of sheets of the integrated difference image to 1 (step S404). The image integration unit 42 judges whether or not the object is moved between the object region of interest in the latest difference image, and the object region of interest of last difference image (step S405).

When the object is moved (step S405—Yes), the image integration unit 42 deletes the integrated image in which the difference images are integrated by the time (step S406). Then, the image integration unit 42 repeats the process subsequent to step S404.

On the other hand, when the object is not moved (step S405—No), the image integration unit 42 updates the integrated image by adding the luminance value of each pixel of the difference image to the luminance value of the corresponding pixel of the integrated image. However, when the counter i is 1, the luminance value of each pixel of the difference image is set as the luminance value of the correspondence pixel of the integrated image. In addition, the image integration unit 42 increments the counter i by 1 (step S407).

After step S407, the image integration unit 42 judges whether or not the value of the counter i exceeds the integration number N (step S408). When the value of counter i is equal to or less than the integration number N (step S408—No), the image integration unit 42 repeats the process subsequent to step S405.

On the other hand, when the value of counter i is greater than the integration number N (step S408—Yes), the image integration unit 42 corrects the luminance value of each pixel of the integrated image by multiplying the correction coefficient α. Then, the image integration unit 42 outputs the corrected integrated image as a biometric image which represents the biometric information of the object captured in the object region of interest (step S409). The correction coefficient α can be, for example, a value obtained by dividing a ratio ($E_0$/E) of the reference exposure time $E_0$ and the exposure time E of the illumination image used for generating the difference image by the integration number, as the correction coefficient in the first embodiment. After that, the processing unit 23 judges whether or not all object regions has been set as the object regions of interest (step S410). When there is an object region which has not been set as the object region of interest (step S410—No), the processing unit 23 performs the process subsequent to step S403.

On the other hand, when all the object regions have already been set as the object regions of interest, the processing unit 23 terminates the biometric image generating process.

The feature extracting unit 43 extracts, from the biometric image generated for each object region, the features of the corresponding object region. The feature extracting unit 43 stores the extracted features in the storage unit 22 in association with the identification number of the corresponding object region.

When performing the biometric authentication process to the biometric information of each user, which is captured in one difference image, the matching unit 44 calculates the degrees of similarity between the input biometric information items included in the objects captured in respective object regions, and the registered biometric information items corresponding to the identification information items of a plurality of users input through the input unit 3. Note that when correspondence between the object region and the identification information item of the user is unknown, the matching unit 44 calculates respective degrees of similarity for all combination of the input biometric information items and the registered biometric information items. The matching unit 44 selects a combination of the input biometric information with the highest total of degree of similarity, and the registered biometric information, and notifies the obtained degree of similarity about the selected combination to the authentication judging unit 45.

Depending on an application, the biometric authentication device 1 performs the biometric authentication process using one of the biometric information items of a plurality of users, which is captured in one difference image, and registers remaining biometric information items. In this case, the matching unit 44 calculates the degrees of similarity between the input biometric information items included in the objects captured in respective object regions and the registered biometric information corresponding to the identification information of one user input through the input unit 3, respectively. Then, the matching unit 44 outputs the higher degree of similarity to the authentication judging unit 45, and notifies the identification number of the object region corresponding to the lower degree of similarity of to the processing unit 23.

When performing the biometric authentication process using the input biometric information of a plurality of users captured in one difference image, and when all degrees of similarity which are calculated for each input biometric information item is equal to or greater than the authentication threshold, the authentication judging unit 45 authenticates the two users. The authentication judging unit 45 notifies the processing unit 23 of the result of the authentication indicating the success to authenticate the user. Then, the processing unit 23 permits each authenticated user to use the apparatus equipped with the biometric authentication device 1 or an apparatus connected to the biometric authentication device 1. For example, when the biometric authentication device 1 is connected or included in the entrance and exit management apparatus, the entrance and exit management apparatus is caused to unlock an electric lock of the door provided at the entrance of the specified section to permit each user to enter the section. On the other hand, when at least one of degrees of similarity is less than the authentication threshold, the authentication judging unit 45 authenticates none of the users. The authentication judging unit 45 notifies the processing unit 23 of the result of the authentication indicating the failure to authenticate the user. The processing unit 23 denies the unauthenticated user an access to the apparatus equipped with the biometric authentication device 1 or the apparatus connected to the biometric authentication device 1. Further, the processing unit 23 causes the display unit 2 to display a message indicating that the authentication has failed.

When the authentication judging unit 45 utilizes one of a plurality of biometric information items captured in one difference image for the biometric authentication and registers others, the authentication judging unit 45 authenticates the one user when the degree of similarity received from the matching unit 44 is equal to or greater than the authentication threshold. The authentication judging unit 45 notifies the processing unit 23 of the result of the authentication indicating the success to authenticate the user. The processing unit 23 stores the features extracted from the input biometric information captured in the object region corresponding to the lower degree of similarity, in association with the identification number of the user for temporal registration received from the input unit 3 in the storage unit 22.

On the other hand, the authentication judging unit 45 does not authenticate a user when the degree of similarity is less than the authentication threshold. The authentication judging unit 45 notifies the processing unit 23 of the result of the authentication indicating the failure to authenticate the user. The processing unit 23 does not perform a temporal registration for the unregistered user. Further, the processing unit 23 causes the display unit 2 to display a message indicating that the authentication has failed.

As has been described above, the biometric authentication device according to the second embodiment determines the integration number for the difference images for each object region in accordance with the variance value of the luminance values for each object region, when a plurality of objects are captured in one difference image. Therefore, the biometric authentication device can generate the biometric image suitable for the biometric authentication for each object region. Note that, when three or more objects are captured in one difference image, the biometric authentication device can generate the biometric image for each object region by performing the similar processes as the case in which two objects are captured in one difference image.

Note that the present invention is not limited to above-described embodiments. In one modification, the integration number determination unit in the first embodiment may determine the integration number based on either the average value of the luminance values or the variance of the luminance values, but not depending on the exposure time dividing number M. The integration number determination unit in the second embodiment may determine the integration number for each object region by substituting the average value of the luminance values for each object region in the equation (6).

The image integration unit may generate a plurality of biometric images continuously. In this case, the storage unit of the authentication unit stores each difference image used for generating the last biometric image in advance, for example. Then, the image integration unit calculates the luminance value of each pixel of the subsequent biometric image according to the following equation, and thereby the computation quantity for generating the biometric image can be reduced rather than adding the difference images, the number of which is the integration number.

$$S(t+1)=\alpha*(S(t)/\alpha-D(t-N+1)+D(t+1)) \quad (12)$$

$S(t)$ represents the luminance value of the pixel of interest in the biometric image generated most recently, and $S(t+1)$ represents the luminance value of the pixel of interest in the biometric image generated next. N represents the integration number. Moreover, $D(t+1)$ represents the luminance value of the pixel of interest of the latest difference image to be utilized for generating the biometric image $S(t+1)$, and $D(t-N+1)$ represents the luminance value of the pixel of interest in the oldest difference image utilized for generating the biometric image $S(t)$. $\alpha$ represents the correction coefficient.

Note that the image integration unit may generate the biometric image according to the following equation.

$$S(t+1)=\alpha*((N-1)*S(t)/(\alpha*N)+D(t+1)) \quad (13)$$

Further, the image acquisition unit may generate the non-illumination images, the number of which is different from the number of the illumination image, for example, only one non-illumination image. Then, the difference image generating unit of the image acquisition control unit may generate a plurality of difference images by calculating differences of the correspondence pixels between each of a plurality of illumination images, and the one non-illumination image.

The matching unit and the authentication judging unit may judge whether or not authenticating the user according to so-called 1:N mode. In this case, the identification number of the user does not need to be input. The matching unit calculates the degrees of similarity of the input biometric information and respective the registered biometric information items of all registered users, which are registered in the authentication unit in advance. The matching unit notifies the authentication judging unit of the maximum value of the degrees of similarity and the identification number of the registered user corresponding to the maximum value.

The authentication judging unit authenticates the user as a legitimate registered user corresponding to the maximum value of the degree of similarity, when the maximum value of the degrees of similarity is equal to or greater than the authentication threshold. On the other hand, when the maximum value of the degrees of similarity is less than the authentication threshold, the authentication judging unit does not authenticate the user.

Further, the biometric authentication device and the biometric authentication method disclosed in the present specification are applicable to various kinds of apparatuses or systems, which perform a biometric authentication process between biometric information of a user and biometric information registered in advance, in order that a user performs a certain operation. Such apparatuses or systems include, for example, a computer system in which one or more terminals are connected to a server via a communication network, or an entrance and exit management apparatus. In this case, each terminal is provided with the image acquisition unit. Each terminal includes a processor, a memory, and periphery circuit thereof, and implements, by a program executed by the processor, a part of functions of the processing unit of the authentication unit according to above-described embodiments, such as functions regarding generation of a biometric image, i.e. the functions of the integration number determination unit and the image integration unit. In this case, each terminal generates the biometric image by integrating the difference images. Then, each terminal transmits the generated biometric image to a server. The server performs the functions of the feature extracting unit, the matching unit, and the authentication judging unit among the functions of the processing unit of the authentication unit according to the above-described embodiment, and thereby performing a registration process of the biometric information or the biometric authentication process.

The computer program, which realizes on a processor each function performed by the image acquisition control unit of the image acquisition unit, and each function performed by the processing unit of the authentication unit, may be distributed in a state where the computer program is recorded on recording medium, such as a magnetic recording medium, an optical recording medium, or a semiconductor memory.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device which performs biometric authentication of a user using a biometric image in which an object carrying biometric information of the user is photographed, comprising:
    an illumination light source which illuminates the object;
    a sensor which generates a plurality of illumination images in which the object is photographed in a state where the illumination light source is turned on, and at least one non-illumination image in which the object is photographed in a state where the illumination light source is turned off;
    at least one processor configured to:
        generate a plurality of difference images by subtracting from a luminance value of each pixel of each illumination image a luminance value of a corresponding pixel of the non-illumination image,
        determine an integration number, based on a statistical value of luminance values of a first difference image which represents an amount of noise superimposed on the first difference image among the plurality of difference images, so that the integration number of the difference images increases as an influence of luminance values of the pixels included in at least one region of the first difference image due to the noise superimposed on the first difference image increases, and
        generate the biometric image by calculating luminance values of respective pixels of the biometric image based on a total of luminance values of the corresponding pixels of the difference images, the number of which is the integration number, among the plurality of difference images.

2. The biometric authentication device according to claim 1, wherein determination of the integration number includes calculation of a variance of the luminance values of pixels in a region, in which the object is captured, in the first difference image as the statistical value of the luminance values, and determination of the integration number so that a variance of the luminance values of pixels of the biometric image estimated from the variance of the luminance values calculated is equal to or less than a predetermined threshold.

3. The biometric authentication device according to claim 2, wherein the predetermined threshold is a variance of luminance values of pixels in the region, when an average value of luminance values of pixels in the region in the biometric image is equal to a reference average value which is an average value of luminance values of pixels in the region in the reference image which is obtained when the object is photographed in a state where the illumination light source is turned on and there is no environmental light.

4. The biometric authentication device according to claim 1, wherein determination of the integration number includes calculation of an average value of the luminance values of pixels in a region, in which the object is captured, in the first difference image as the statistical value of the luminance values, and determination of the integration number by dividing, by the average value, a reference average value which is an average value of luminance values of pixels in the region in the reference image which is obtained when the object is photographed in a state where the illumination light source is turned on and there is no environmental light.

5. The biometric authentication device according to claim 1, wherein
    when an exposure time dividing number is equal to or less than a predetermined threshold, the exposure time dividing number being obtained by dividing second exposure time by first exposure time, the second exposure time being for generating the biometric image by photographing the object in a state where the illumination light source is turned on and there is no environmental light when a part of the object closest to the sensor is located in the shortest distance of a distance range capable of photographing by the sensor, the first exposure time of the sensor being for a generation of each illumination image, determination of the integration number includes calculation of an average value of the luminance values of pixels in a region, in which the object is captured, in the first difference image as the statistical value of the luminance values, and determination of the integration number based on the average value, and on the other hand, when the exposure time dividing number is greater than the predetermined threshold, the determination of the integration number includes calculation of a variance of the luminance values of pixels in the region, in which the object is captured, in the first difference image as the statistical value of the luminance values, and determination of the integration number based on the variance of the luminance values.

6. The biometric authentication device according to claim 1, wherein
a second object is captured in the plurality of illumination images with the object,
the at least one processor is further configured to extract, from the first difference image, a first object region in which the object is captured, and a second object region in which the second object is captured,
determination of the integration number includes determination of a first integration number for the first object region based on the statistical value of luminance values of pixels in the first object region, the statistical value representing an amount of noise superimposed on the first object region, and determination of a second integration number for the second object region based on the statistical value of luminance values of pixels in the second object region, the statistical value representing an amount of noise superimposed on the second object region, and
generation of the biometric image includes generation of a first biometric image by calculating the luminance value of each pixel in the first object region in the biometric image based on a total of the luminance values between the correspondence pixels in the first object region in each of the first integration number of the difference images among the plurality of difference images, and generation of a second biometric image by calculating the luminance value of each pixel in the second object region in the biometric image based on a total of the luminance values between the correspondence pixels in the second object region in each of the second integration number of the difference images among the plurality of difference images.

7. The biometric authentication device according to claim 1,
further comprising a storage device which stores data concerning the registered biometric information of registered user which is registered in advance, and
wherein the at least one processor is further configured to compare the registered biometric information and the biometric information of the user based on the data and the biometric image.

8. A biometric authentication method which performs biometric authentication of a user using a biometric image in which an object carrying biometric information of the user is photographed, comprising:
generating a plurality of illumination images in which the object is photographed in a state where an illumination light source is illuminating the object, and at least one non-illumination image in which the object is photographed in a state where the illumination light source is turned off;
generating a plurality of difference images by subtracting from a luminance value of each pixel of each illumination image a luminance value of corresponding pixel of the non-illumination image;
determining an integration number, based on a statistical value of luminance values of a first difference image which represents an amount of noise superimposed on the first difference image among the plurality of difference images, so that the integration number of the difference images increases as an influence of luminance values of the pixels included in at least one region of the first difference image due to the noise superimposed on the first difference image increases;
generating the biometric image by calculating luminance values of respective pixels of the biometric image based on a total of luminance values of the corresponding pixels of the difference images, the number of which is the integration number, among the plurality of difference images; and
comparing the biometric information of the user with registered biometric information using the biometric image and data concerning the registered biometric information which is the biometric information of the registered user stored in a storage unit.

9. The biometric authentication method according to claim 8, wherein the determining the integration number calculates a variance of the luminance values of pixels in a region, in which the object is captured, in the first difference image as the statistical value of the luminance values, and determination of the integration number so that a variance of the luminance values of pixels of the biometric image estimated from the variance of the luminance values calculated is equal to or less than a predetermined threshold.

10. The biometric authentication method according to claim 9, wherein the predetermined threshold is a variance of luminance values of pixels in the region, when an average value of luminance values of pixels in the region in the biometric image is equal to a reference average value which is an average value of luminance values of pixels in the region in the reference image which is obtained when the object is photographed in a state where the illumination light source is turned on and there is no environmental light.

11. The biometric authentication method according to claim 8, wherein the determining the integration number calculates an average value of the luminance values of pixels in a region, in which the object is captured, in the first difference image as the statistical value of the luminance values, and determines the integration number by dividing, by the average value, a reference average value which is an average value of luminance values of pixels in the region in the reference image which is obtained when the object is photographed in a state where the illumination light source is turned on and there is no environmental light.

12. The biometric authentication method according to claim 8, wherein
when an exposure time dividing number is equal to or less than a predetermined threshold, the exposure time dividing number being obtained by dividing second exposure time by first exposure time, the second exposure time being for generating the biometric image by photographing the object in a state where the illumination light source is turned on and there is no environmental light when a part of the object closest to the sensor is located in the shortest distance of a distance range capable of photographing by the sensor, the first exposure time of the sensor being for a generation of each illumination image, the determining the integration number calculates an average value of the luminance values of pixels in a region, in which the object is captured, in the first difference image as the statistical value of the luminance values, and determines the integration number based on the average value, and on the other hand, when the exposure time dividing number is greater than the predetermined threshold, the determining the integration number calculates a variance of the luminance values of pixels in the region, in which the object is captured, in the first difference image as the statistical value of the luminance values, and determines the integration number based on the variance of the luminance values.

13. The biometric authentication method according to claim 8, wherein
a second object is captured in the plurality of illumination images with the object, and the biometric authentication method further comprising:

extracting, from the first difference image, a first object region in which the object is captured, and a second object region in which the second object is captured, and wherein the determining the integration number determines a first integration number for the first object region based on the statistical value of luminance values of pixels in the first object region, the statistical value representing an amount of noise superimposed on the first object region, and determines a second integration number for the second object region based on the statistical value of luminance values of pixels in the second object region, the statistical value representing an amount of noise superimposed on the second object region, and the generating the biometric image generates the biometric image by calculating the luminance value of each pixel in the first object region in the biometric image based on a total of the luminance values between the correspondence pixels in the first object region in each of the first integration number of the difference images among the plurality of difference images, and generates a second biometric image by calculating the luminance value of each pixel in the second object region in the biometric image based on a total of the luminance values between the correspondence pixels in the second object region in each of the second integration number of the difference images among the plurality of difference images.

* * * * *